(12) United States Patent
Nakajima et al.

(10) Patent No.: US 11,031,177 B2
(45) Date of Patent: Jun. 8, 2021

(54) POWER CONVERTER

(71) Applicant: MITSUBISHI ELECTRIC CORPORATION, Tokyo (JP)

(72) Inventors: Koji Nakajima, Tokyo (JP); Takashi Kumagai, Tokyo (JP); Jun Tahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 622 days.

(21) Appl. No.: 15/756,097

(22) PCT Filed: Aug. 24, 2016

(86) PCT No.: PCT/JP2016/074597
§ 371 (c)(1),
(2) Date: Feb. 28, 2018

(87) PCT Pub. No.: WO2017/038567
PCT Pub. Date: Mar. 9, 2017

(65) Prior Publication Data
US 2018/0261382 A1 Sep. 13, 2018

(30) Foreign Application Priority Data
Sep. 1, 2015 (JP) .............................. JP2015-171707

(51) Int. Cl.
*H01F 27/28* (2006.01)
*H01F 30/10* (2006.01)
*H01F 17/04* (2006.01)
*H01F 27/32* (2006.01)
*H02M 3/28* (2006.01)

(52) U.S. Cl.
CPC ............. *H01F 30/10* (2013.01); *H01F 17/04* (2013.01); *H01F 27/2847* (2013.01); *H01F 27/323* (2013.01); *H02M 3/28* (2013.01)

(58) Field of Classification Search
USPC .................................. 336/212, 182, 184, 221
See application file for complete search history.

(56) References Cited

U.S. PATENT DOCUMENTS

| | | | |
|---|---|---|---|
| 7,365,624 B2* | 4/2008 | Young | H01F 17/0006 336/212 |
| 2013/0182478 A1* | 7/2013 | Nomura | H02M 7/42 363/123 |

FOREIGN PATENT DOCUMENTS

| | | |
|---|---|---|
| JP | H07-115024 A | 5/1995 |
| JP | 2009-177019 A | 8/2009 |
| JP | 2015-144229 A | 8/2015 |

OTHER PUBLICATIONS

International Search Report (PCT/ISA/210) dated Oct. 11, 2016, by the Japanese Patent Office as the International Searching Authority for International Application No. PCT/JP2016/074597.

(Continued)

*Primary Examiner* — Shawki S Ismail
*Assistant Examiner* — Kazi S Hossain
(74) *Attorney, Agent, or Firm* — Buchanan Ingersoll & Rooney PC

(57) ABSTRACT

A power converter includes a magnetic core and a plurality of windings. The plurality of windings are each wound around the magnetic core and bent to have a portion extending in the direction in which the magnetic core extends. Each of the plurality of windings is bent to include a region located farthest out from the magnetic core among all of the plurality of windings.

10 Claims, 15 Drawing Sheets

(56) References Cited

OTHER PUBLICATIONS

Written Opinion (PCT/ISA/237) dated Oct. 11, 2016, by the Japanese Patent Office as the International Searching Authority for International Application No. PCT/JP2016/074597.

* cited by examiner

POWER CONVERTER

TECHNICAL FIELD

The present invention relates to power converters, and particularly relates to a power converter including a magnetic component such as transformer.

BACKGROUND ART

A conventional transformer structure as disclosed for example in Japanese Patent Laying-Open No. 7-115024 (Patent Document 1) includes a primary printed circuit board in which a primary winding is wound around a through hole and a secondary printed circuit board in which a secondary winding is wound around a through hole, the primary and secondary printed circuit boards are stacked together, and two cores are inserted in the through holes. In the transformer structure of Patent Document 1, the primary winding and the secondary winding are held between one core inserted in the direction from the primary printed circuit board and the other core inserted in the direction from the secondary printed circuit board.

Another transformer structure as disclosed for example in Japanese Patent Laying-Open No. 2009-177019 (Patent Document 2) includes a primary winding and a secondary winding wound around a through hole formed in a single flexible circuit board, two cores are inserted in the through hole, and the surface of the flexible circuit board is bent to extend in the direction in which the two cores extend. In the transformer structure of Patent Document 2 as well, the primary winding and the secondary winding are held between one core inserted in the direction from one surface of the flexible circuit board and the other core inserted in the direction from the other surface of the flexible circuit board.

In both the transfer structures, the primary winding and the secondary winding are each formed as a copper foil pattern, and the position of the pattern is fixed by a resin material formed on the circuit board. Accordingly, each of the distance between windings and the distance between the winding and the core is kept at an appropriate value, which enables an electrically insulating state between windings, for example, to be maintained.

CITATION LIST

Patent Document

PTD 1: Japanese Patent Laying-Open No. 7-115024
PTD 2: Japanese Patent Laying-Open No. 2009-177019

SUMMARY OF INVENTION

Technical Problem

Each winding disclosed in Patent Documents 1 and 2 is formed as a copper foil pattern. The winding is therefore thin and has a small conductor cross-sectional area. Large current passed through the winding thus causes a considerably large amount of heat to be generated. According to Patent Documents 1 and 2, however, efficient heat dissipation from each winging appears to be difficult. In particular, although Patent Document 2 has an advantage that the transformer structure is made compact by bending the flexible circuit board, it is difficult to dissipate, to the outside, the heat generated from the secondary winding located relatively closer to the core, namely located inside, as a result of bending of the circuit board.

The present invention has been made in view of the above problems, and an object of the present invention is to provide a power converter that enables both high dissipation of heat from the windings and downsizing of the entire power converter.

Solution to Problem

A power converter of the present invention includes a magnetic core and a plurality of windings. The plurality of windings are each wound around the magnetic core and bent to have a portion extending in a direction in which the magnetic core extends. Each of the plurality of windings is bent to include a region located farthest out from the magnetic core among all of the plurality of windings.

Advantageous Effects of Invention

According to the present invention, the windings are bent to have a portion extending in the direction in which the magnetic core extends, and thus the entire power converter is downsized. Moreover, a plurality of windings are each bent to include a region located farthest out from the magnetic core among all of the windings, which enables heat generated from the winding to be dissipated from the region located farthest out from the magnetic core.

DESCRIPTION OF EMBODIMENTS

In the following, embodiments of the present invention are described based on the drawings.

First Embodiment

Figure 1:
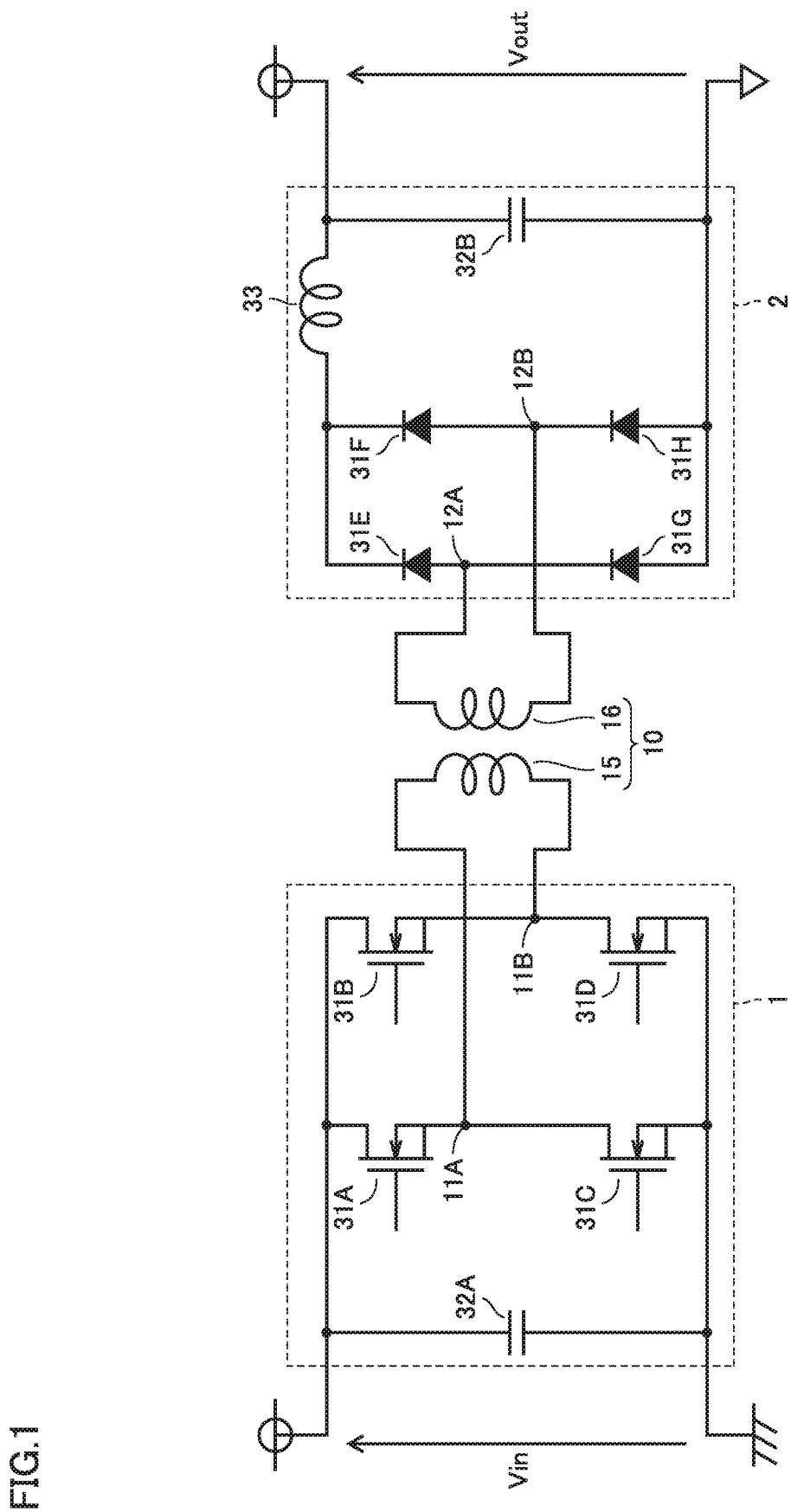
FIG. 1 is a circuit block diagram of a power converter according to an embodiment.

Initially, using FIG. 1, a description is given of an example of a circuit diagram of a power converter in the present embodiment. Referring to FIG. 1, the power converter in the present embodiment mainly includes an input-side drive circuit 1, an output-side drive circuit 2, and a transformer 10.

Input-side drive circuit 1 includes four switching elements 31A, 31B, 31C, 31D, and a capacitor 32A. Output-side drive circuit 2 includes four rectifying elements 31E, 31F, 31G, 31H, a capacitor 32B, and a coil 33. Transformer 10 includes a primary winding 15 and a secondary winding 16.

In input-side drive circuit 1, four switching elements 31A, 31B, 31C, 31D are connected in the manner shown in FIG. 1. Specifically, series-connected switching elements 31A and 31C are connected in parallel with series-connected switching elements 31B and 31D. A connecting point 11A is located between switching element 31A and switching element 31C, and a connecting point 11B is located between switching element 31B and switching element 31D. Primary winding 15 is connected between connecting points 11A and 11B. Switching elements 31A, 31B, 31C, 31D are semiconductor elements such as MOSFET (Metal Oxide Semiconductor Field Effect Transistor) controlled to be alternately turned ON and OFF so as to generate positive and negative voltages on primary winding 15 of transformer 10. The positive and negative voltages generated on primary winding 15 of transformer 10 are determined by input voltage $V_{in}$ applied to capacitor 32A.

In output-side drive circuit 2, four rectifying elements 31E, 31F, 31G, 31H are connected in the manner shown in FIG. 1. Specifically, series-connected rectifying elements 31E and 31G are connected in parallel with series-connected rectifying elements 31F and 31H. Rectifying elements 31E, 31F, 31G, 31H are commonly known diodes, for example. In FIG. 1, the anode of rectifying element 31E is connected to the cathode of rectifying element 31G, and the anode of rectifying element 31F is connected to the cathode of rectifying element 31H.

A connecting point 12A is located between rectifying element 31E and rectifying element 31G, and a connecting point 12B is located between rectifying element 31F and rectifying element 31H. A second winding 12 is connected between connecting points 12A and 12B. Rectifying elements 31E, 31F, 31G, 31H thus have a function of rectifying a voltage generated on secondary winding 16 of transformer 10. In output-side drive circuit 2, coil 33 and capacitor 32B are connected and they have a function of smoothing the voltage rectified by rectifying elements 31E, 31F, 31G, 31H. Specifically, one end of coil 33 is connected to respective cathodes of rectifying elements 31E, 31F, and the other end of coil 33 is connected to one end of capacitor 32B. The other end of capacitor 32B is connected to respective anodes of rectifying elements 31G, 31H.

Output voltage $V_{out}$ applied to capacitor 32B is controlled so that output voltage $V_{out}$ is higher than input voltage $V_{in}$ (step up) or lower than input voltage $V_{in}$ (step down), by means of the turns ratio between primary winding 15 and secondary winding 16 forming transformer 10, as well as the ON/OFF time of switching elements 31A, 31B, 31C, 31D.

Next, using FIGS. 2 to 8, a description is given of a specific configuration of the power converter in the present embodiment.

Figure 2:
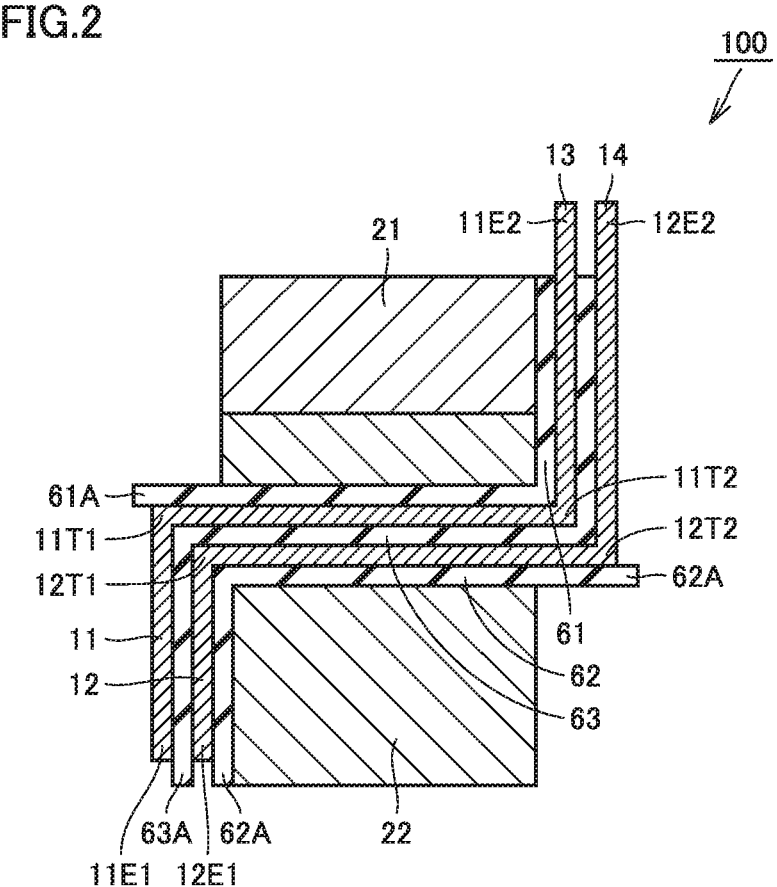
FIG. 2 is a schematic cross-sectional view showing a configuration of a power converter in a first example of a first embodiment.

Referring to FIG. 2, power converter 100 in a first example of the present embodiment includes above-described transformer 10. Transformer 10 mainly includes an I-type magnetic core 21 and an E-type magnetic core 22 that are a pair of magnetic cores, for example, and a plurality of windings that are specifically a first winding 11 and a second winding 12.

I-type magnetic core 21 and E-type magnetic core 22 are magnetic members arranged to form transformer 10 that is a magnetic component (see FIG. 1). I-type magnetic core 21 is mounted to be superposed on E-type magnetic core 22 as seen in plan view (as seen from above in FIG. 2).

In the present embodiment, first winding 11 corresponds to primary winding 15 in FIG. 1, and second winding 12 corresponds to secondary winding 16 in FIG. 1. In the following embodiments, the magnetic component may not necessarily be transformer 10 and first winding 11 and second winding 12 may not necessarily correspond to primary winding 15 and secondary winding 16 of transformer 10. Therefore, in the description of all the embodiments, primary winding 15 and secondary winding 16 in FIG. 1 are herein referred to as first winding 11 and second winding 12 (terms that may cover windings that are not components of transformer 10), respectively, for the sake of consistency.

Figure 3:
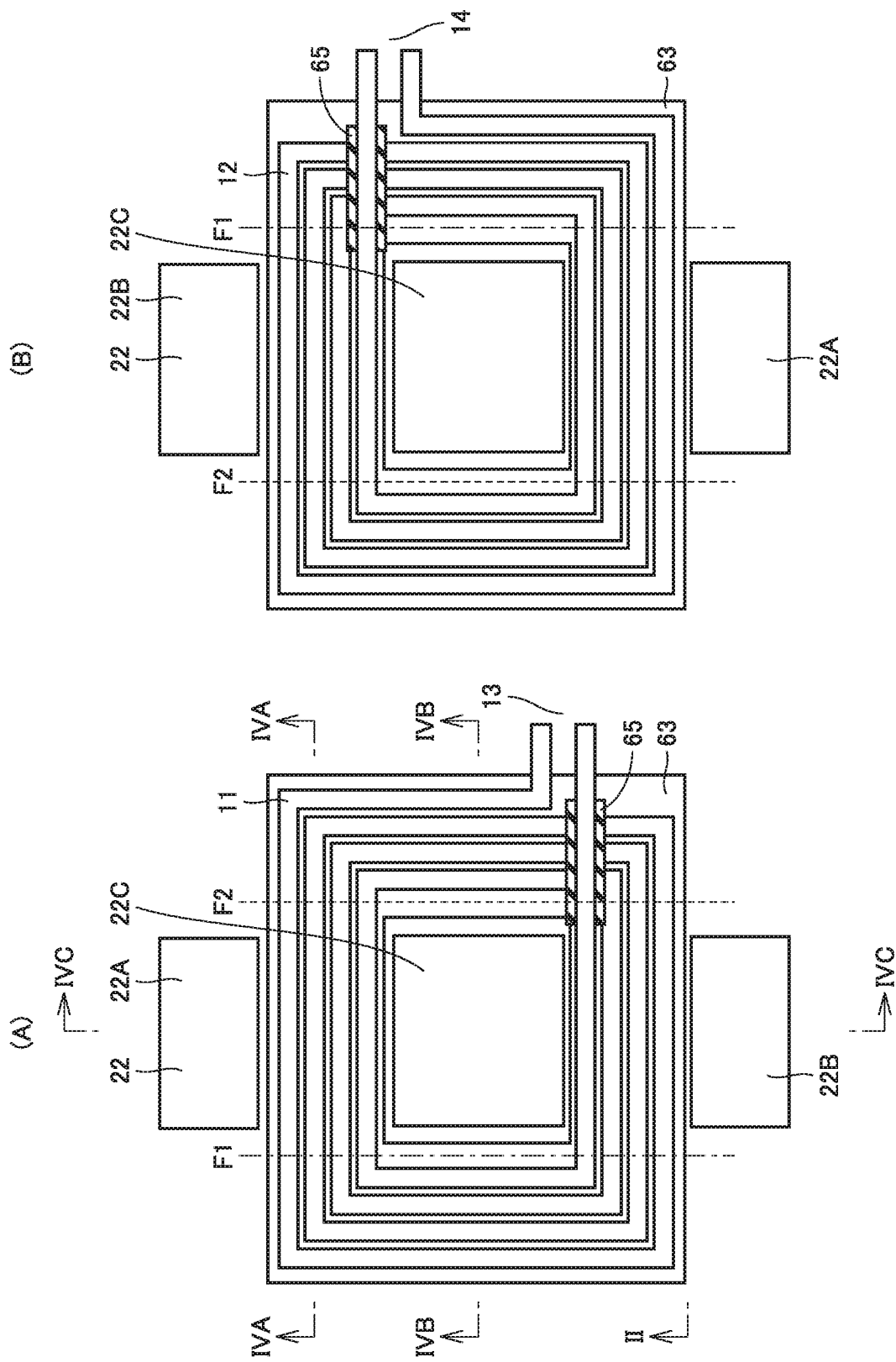
FIG. 3 shows a schematic plan view (A) of a first winding as seen from above the first winding, before the first winding wound around a center leg of a lower magnetic core is bent in the first example of the first embodiment, and a schematic plan view (B) of a second winding as seen from below the second winding, before the second winding wound around the center leg of the lower magnetic core is bent in the first example of the first embodiment.

For example, referring to FIG. 3 and FIG. 4(C), I-type magnetic core 21 is a so-called I-type core having a rectangular flat-sheet shape, and E-type magnetic core 22 is a so-called E-type core including outer legs 22A, 22B, a center leg 22C, and a core coupling portion 22D. For example, referring to FIG. 4(C), outer legs 22A, 22B and center leg 22C extend in the top-bottom direction in FIG. 4(C) and core coupling portion 22D extends in the right-left direction in FIG. 4(C). Center leg 22C is located between outer leg 22A and outer leg 22B and spaced from each of outer leg 22A and outer leg 22B. Core coupling portion 22D forms a single body together with outer legs 22A, 22B and center leg 22C and extends orthogonally to the outer and center legs.

Referring to FIG. 2 and FIGS. 3(A) and (B), a plurality of (two) windings, namely first winding 11 and second winding 12 are particularly wound around center leg 22C that is a part of E-type magnetic core 22. In FIG. 3, first winding 11 and second winding 12 each have four turns, by way of example. The number of turns of first winding 11 and second winding 12, however, may be any number.

In each of first winding 11 and second winding 12, turns wound around center leg 22C are spaced from each other. An insulating member 63 is superposed on a plane formed by the turns of first winding 11 and a plane formed by the turns of second winding 12.

As shown in FIG. 2, first winding 11 is wound at a higher level in FIG. 2 (relatively closer to I-type magnetic core 21) than second winding 12, by way of example, not by way of limitation. For example, second winding 12 may be wound at a higher level in FIG. 2 than first winding 11. In any case, insulating member 63 is located between a plurality of windings, specifically between first winding 11 (one winding) and second winding 12 (the other winding). Insulating member 63 is in contact with both first winding 11 and second winding 12.

FIG. 3(A) and FIG. 3(B) show a state of first winding 11 and second winding 12 before being bent along a dashed-dotted line F1 and a dotted line F2 in FIG. 3 (namely only having been wound around center leg 22C). More specifically, referring to FIG. 4(A), regarding the portion of first winding 11 for example extending in the right-left direction in FIG. 3(A), I-type magnetic core 21 is disposed directly above (and spaced from) this portion and core coupling portion 22D of E-type magnetic core 22 is disposed directly below (and spaced from) this portion. Regarding the right and left ends of this portion of first winding 11 extending in the right-left direction in FIG. 3 without being bent, I-type magnetic core 21 and E-type magnetic core 22 are not located directly above and below the right and left ends. Referring to FIG. 4(B), the portion of first winding 11 extending in the top-bottom direction in FIG. 3(A) is disposed in a region outside the region in which I-type magnetic core 21 is superposed on E-type magnetic core 22. While only first winding 11 is shown and described, basically the same is applied to second winding 12.

Figure 4:
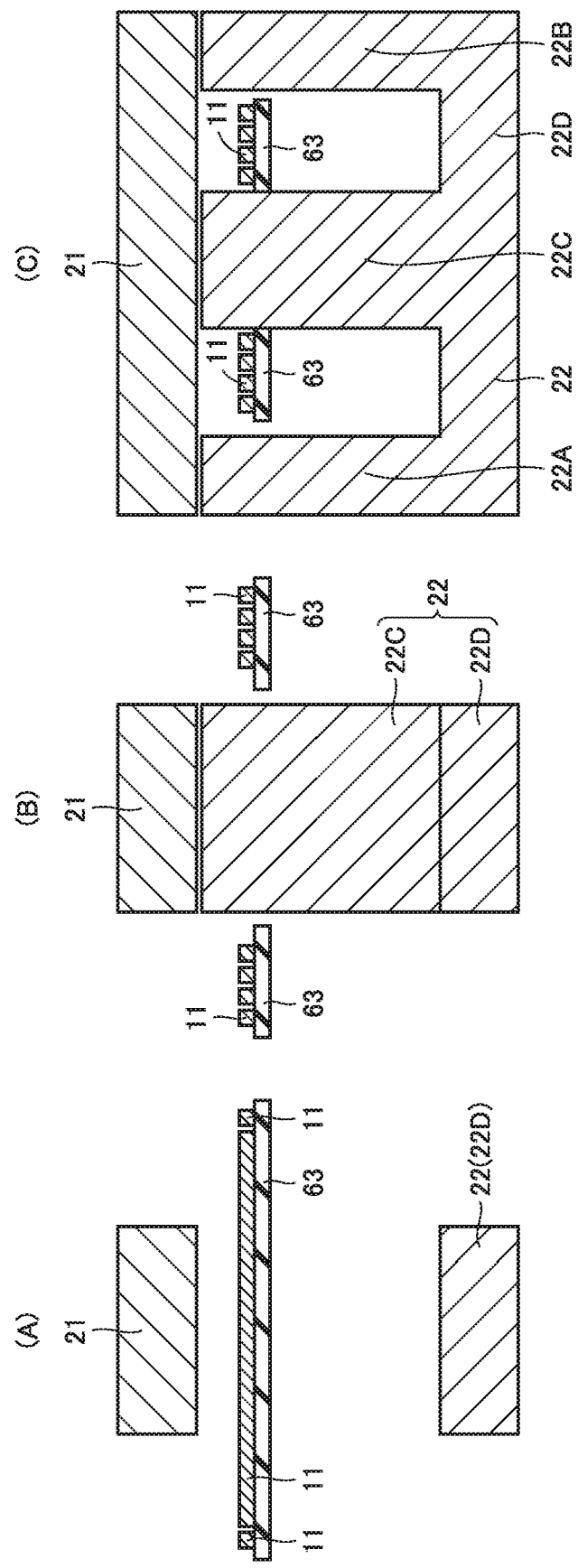
FIG. 4 shows a schematic cross-sectional view (A) along line IVA-IVA in FIG. 3(A), a schematic cross-sectional view (B) along line IVB-IVB in FIG. 3(A), and a schematic cross-sectional view (C) along line IVC-IVC in FIG. 3(A).
Figure 5:
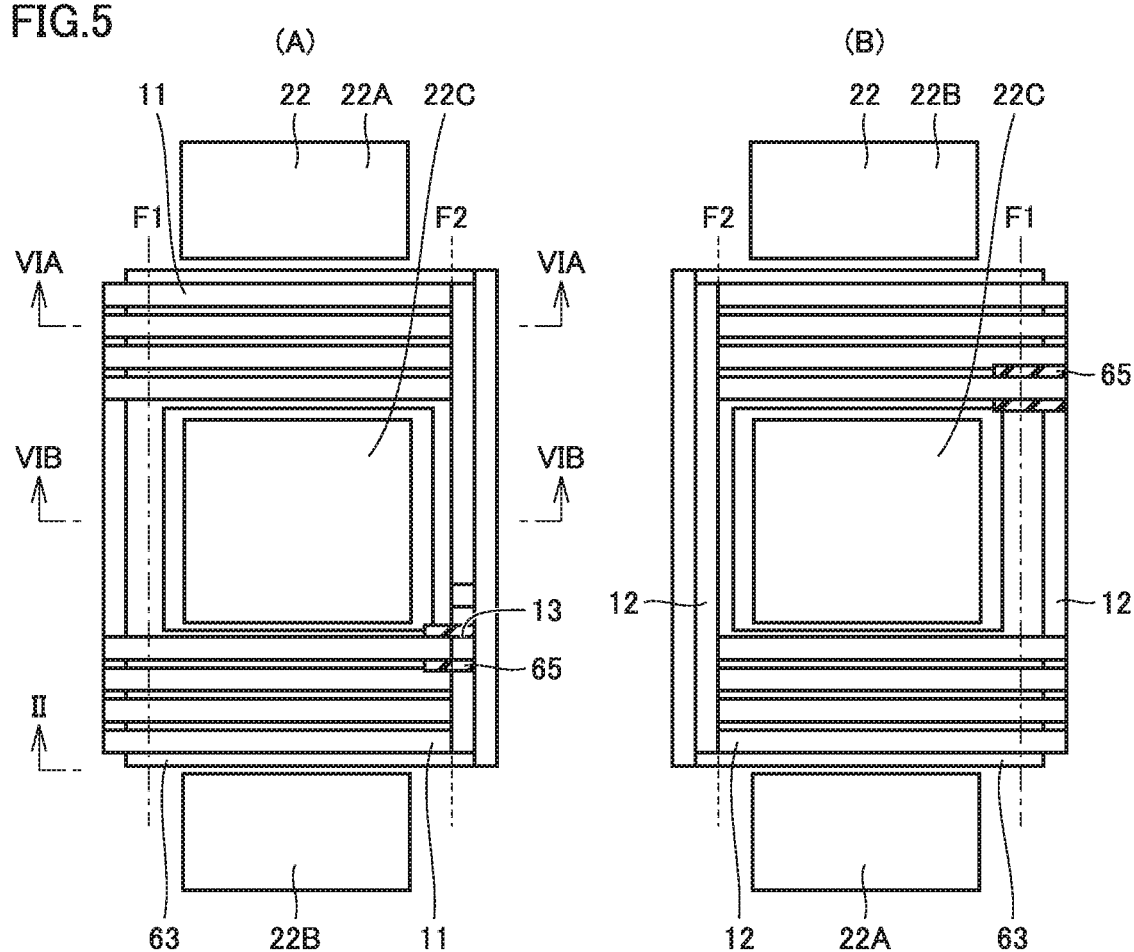
FIG. 5 shows a schematic plan view (A) of the first winding as seen from above the first winding, after the first winding wound around the center leg of the lower magnetic core is bent in the first example of the first embodiment, and a schematic plan view (B) of the second winding as seen from below the second winding, after the second winding wound around the center leg of the lower magnetic core is bent in the first example of the first embodiment.
Figure 6:
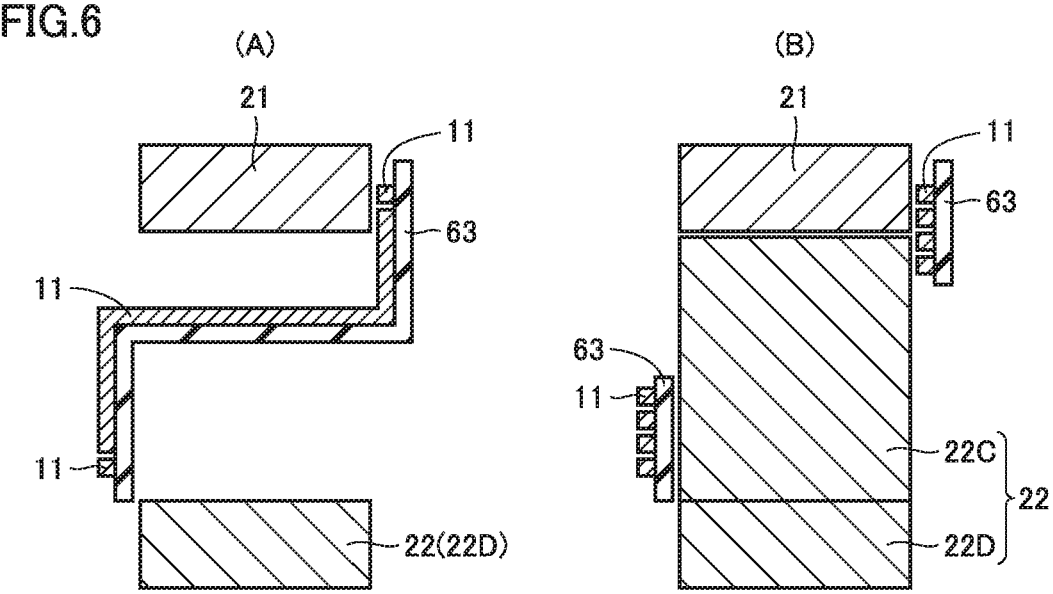
FIG. 6 shows a schematic cross-sectional view (A) along line VIA-VIA in FIG. 5(A), and a schematic cross-sectional view (B) along line VIB-VIB in FIG. 5(A).

Referring to FIGS. 5 and 6, first winding 11 and second winding 12 shown in FIGS. 3 and 4 have been bent along dashed-dotted line F1 rearward with respect to the plane of FIGS. 3 and 5 and bent along dotted line F2 frontward with respect to the plane of FIGS. 3 and 5. The region located leftward of dashed-dotted line F1 and the region located rightward of dotted line F2 in FIG. 3(A) for example are each bent to extend substantially orthogonally to the region located between dashed-dotted line F1 and dotted line F2.

Accordingly, as shown particularly in FIG. 6(A), the region of first winding 11 that is located leftward of dashed-dotted line F1 and the region thereof that is located rightward of dotted line F2 in FIG. 3(A) before first winding 11 is bent are the regions extending in the direction in which the magnetic cores extend, namely the top-bottom-direction in the drawing in which center leg 22C of E-type magnetic core 22 extends, and these regions are located on the right side and the left side respectively in FIG. 6(A). As shown particularly in FIG. 6(B), the four turns of first winding 11 are spaced from each other and arranged in the top-bottom direction as seen in the cross-sectional view of FIG. 6. A layer of insulating member 63 is disposed on the side of first winding 11, namely between first winding 11 and E-type magnetic core 22.

Because first winding 11, second winding 12, I-type magnetic core 21, and E-type magnetic core 22 are arranged in the manner shown in FIGS. 3 to 6 as described above, actually no cross section shows the manner of arrangement shown in FIG. 2. The manner of arrangement shown in FIG. 2 is rather close to an arrangement in a side view as seen from the position of arrow II in FIG. 3(A) and FIG. 5(A) in the direction indicated by arrow II. For the sake of facilitating visual recognition and understanding of the positional relation between first winding 11, second winding 12, I-type magnetic core 21, and E-type magnetic core 22, a pseudo cross-sectional view like the side view shown in FIG. 2 is also used herein to explain the configuration of power converter 100 in the following embodiments.

Referring again to FIG. 2, two windings, namely first winding 11 and second winding 12 are each bent along dashed-dotted line F1 and dotted line F2 as shown in FIGS. 5 and 6. Accordingly, a first portion and a second portion, as described below, of each of first winding 11 and second winding 12 extend in the top-bottom direction in which magnetic cores 21, 22 extend in FIG. 2. The first portion extends between one end of each winding, namely the bottommost portion thereof in FIG. 2, and a first bent portion at dashed-dotted line F1. The second portion extends between the other end of each winding, namely the topmost portion thereof in FIG. 2, and a second bent portion at dotted line F2. The first portion extends downward in FIG. 2 from the first bent portion, while the second portion extends upward in FIG. 2 from the second bent portion. In other words, the direction in which the first portion extends is opposite to the direction in which the second portion extends. Therefore, in FIG. 2, the two windings, namely first winding 11 and second winding 12, are each bent in so-called S-shape. As first winding 11 and second winding 12 are bent, insulating member 63 held between these windings is also bent at positions corresponding to the first and second bent portions.

In the cross section as shown in FIG. 2, first winding 11 has a bottommost portion 11E1 and a topmost portion 11E2 in the direction in which magnetic cores 21, 22 extend (top-bottom direction in FIG. 2), and bottommost portion 11E1 and topmost portion 11E2 are herein defined as one end and the other end, respectively. In the cross section in FIG. 2, first winding 11 has a bent portion relatively closer to bottommost portion 11E1 and a bent portion relatively closer to topmost portion 11E2, and the former bent portion and the latter bent portion are defined as first bent portion 11T1 and second bent portion 11T2, respectively. The region between bottommost portion 11E1 and first bent portion 11T1 is the first portion, and the region between second bent portion 11T2 and the topmost portion 11E2 is the second portion. Likewise, in the cross section as shown in FIG. 2, second winding 12 has a bottommost portion 12E1 and a topmost portion 12E2 in the direction in which magnetic cores 21, 22 extend (top-bottom direction in FIG. 2), and bottommost portion 12E1 and topmost portion 12E2 are defined as one end and the other end, respectively. In the cross section in FIG. 2, second winding 12 has a bent portion relatively closer to bottommost portion 12E1 and a bent portion relatively closer to topmost portion 12E2, and the former bent portion and the latter bent portion are defined as first bent portion 12T1 and second bent portion 12T2, respectively. The region between bottommost portion 12E1 and first bent portion 12T1 is the first portion, and the region between second bent portion 12T2 and topmost portion 12E2 is the second portion.

As shown in FIG. 2, as a result of the bending in S shape, the first portion of first winding 11 (one winding) is located outside the first portion of second winding 12 (the other winding), with respect to magnetic cores 21, 22. The second portion of second winding 12 is located outside the second portion of first winding 11, with respect to magnetic cores 21, 22. Each of a plurality of windings 11, 12 is thus bent to include a region located farthest out from I-type magnetic core 21 and E-type magnetic core 22, among all these windings 11, 12.

Both first winding 11 and second winding 12 extend through a printed circuit board (not shown in FIG. 2 for example) and thereby electrically connect to the printed circuit board (to electrode pads or the like formed on the printed circuit board). First winding 11 and second winding 12 include respective portions extending toward the printed circuit board to form extensions 13, 14 that are electrically connectable to other elements, for example. Referring again to FIG. 3(A) and FIG. 3(B) for example, extensions 13, 14 can be formed by providing insulating members 65 to allow extensions 13 and 14 to cross first winding 11 and second winding 12, respectively, wound around center leg 22C, without being short-circuited with first winding 11 and second winding 12. Insulating member 65 is preferably formed by an insulating tape of polyester or polyimide, or an insulating sheet of silicone material, for example.

Referring again to FIG. 2, an insulating member 61 is disposed between the magnetic cores (I-type magnetic core 21 and E-type magnetic core 22) and one of the surfaces of first winding 11 that is opposite to the other surface thereof facing second winding 12. Insulating member 61 is in contact with both first winding 11 and the magnetic cores (I-type magnetic core 21 and E-type magnetic core 22). An insulating member 62 is disposed between the magnetic core (E-type magnetic core 22) and one of the surfaces of second winding 12 that is opposite to the other surface thereof facing first winding 11. Insulating member 62 is in contact with both second winding 12 and E-type magnetic core 22.

Insulating members 61, 62 are made of the same electrically insulating material as insulating member 63. Specifically, insulating members 61, 62, 63 may be bent insulating paper such as aramid paper. Alternatively, insulating members 61, 62, 63 may be formed by molding a resin material such as polyphenylene sulfide or polybutylene terephthalate.

Actually, in a cross section as shown in FIG. 6(A) and FIG. 6(B) for example, turns of first winding 11 and second winding 12 are visually recognizable as being spaced from each other, depending on the number of turns of each winding. FIG. 2, however, does not exactly show such an arrangement for the sake of simplicity, but shows first and second windings as being disposed continuously in the direction in which the winding extends.

Figure 7:
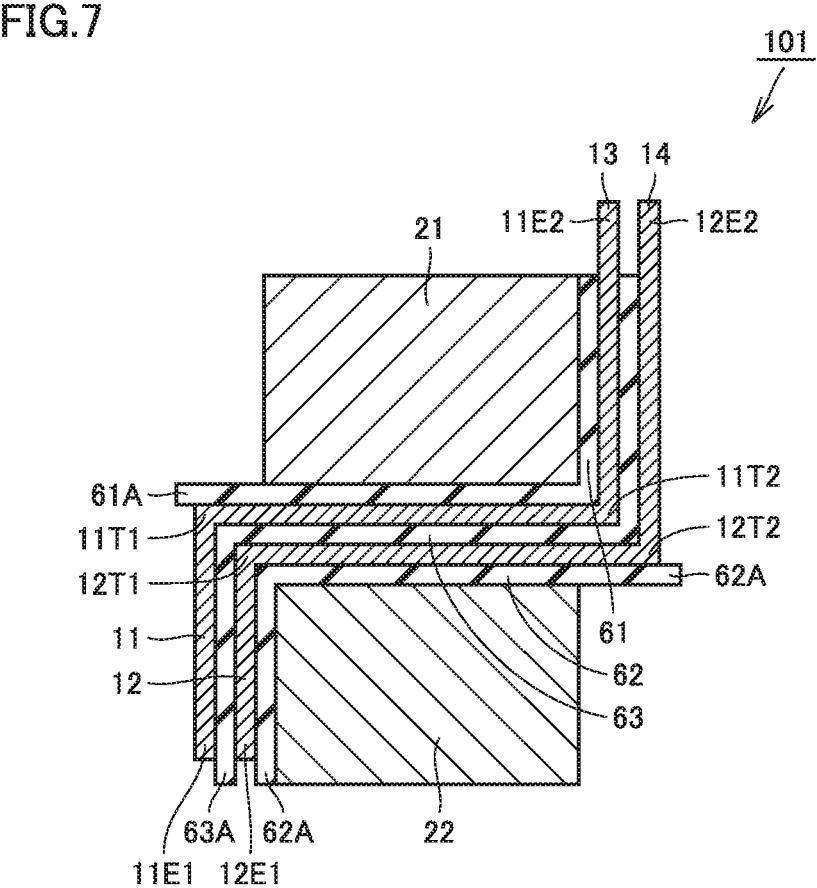
FIG. 7 is a schematic cross-sectional view showing a configuration of a second example different from the configuration of the power converter in FIG. 2 according to the first embodiment.

In view of the fact that I-type magnetic core 21 that is an I-type core is smaller in dimension in the top-bottom direction (smaller in thickness) than E-type magnetic core 22 that is an E-type core, FIG. 2 shows E-type magnetic core 22 extending into the region located higher than first and second windings 11, 12 extending in the right-left direction in FIG. 2, by way of example, not by way of limitation. For example, referring to FIG. 7, in a power converter 101 as a second example in the present embodiment, I-type magnetic core 21 may be disposed in the whole region located higher than first and second windings 11, 12 extending in the right-left direction in FIG. 2, and E-type magnetic core 22 may be disposed in the whole region located lower than first and second windings 11, 12 extending in the right-left direction. In FIG. 7, windings 11, 12 and insulating members 61, 62, 63 are wound around the uppermost region of center leg 22C of E-type magnetic core 22. Power converter 101 in FIG. 7, however, is basically similar to power converter 100 as a first example in the present embodiment in FIG. 2, except for the above respects. Therefore, the same elements are denoted by the same reference numerals, and the description thereof will not be repeated.

Figure 8:
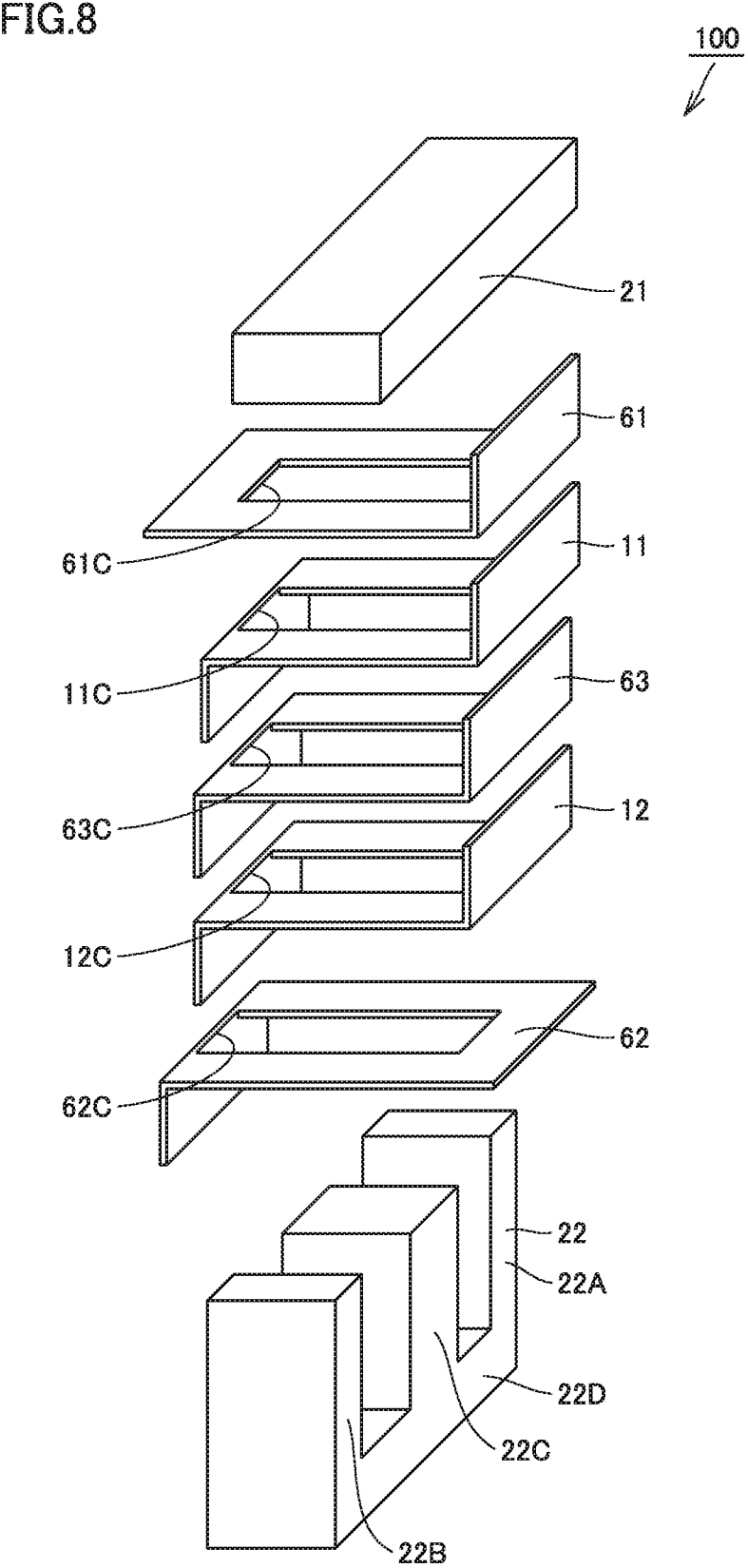
FIG. 8 is an exploded perspective view showing a configuration of the power converter in the first example of the first embodiment shown in FIG. 2.

Using the exploded perspective view of FIG. 8, a general description is given of a method for assembling power converter 100 shown in FIG. 2. Referring to FIG. 8, E-type magnetic core 22 is prepared as a bottommost layer among the members stacked together in the top-bottom direction. E-type magnetic core 22 is preferably mounted in such a manner that core coupling portion 22D is a bottommost part and outer legs 22A, 22B and center leg 22C protrude upward from core coupling portion 22D.

Insulating member 62, second winding 12, insulating member 63, first winding 11, and insulating member 61 that are bent in advance at desired first and second bent portions (dashed-dotted line F1 and dotted line F2 for example) into so-called S shape as described above are then stacked in this order in such a manner that they are wound around center leg 22C. In insulating member 62, second winding 12, insulating member 63, first winding 11, and insulating member 61, respective openings 62C, 12C, 63C, 11C, 61C like through holes are formed for allowing center leg 22C to pass through the openings. Center leg 22C extends through these openings 62C, 12C, 63C, 11C, 61C. When the magnetic component is transformer 10 (see FIG. 1), first winding 11 corresponds to primary winding 15 (see FIG. 1) and second winding 12 corresponds to secondary winding 16 (see FIG. 1).

In FIG. 8, insulating members 61, 62, 63 are prepared as members separate from each other. First winding 11 and second winding 12 bent into S shape, for example, may be formed by means of insert molding from a resin material such as polyphenylene sulfide with high electrical insulation, and accordingly, insulating members 61, 62, 63 forming a single body may be fed and superposed on first winding 11 and second winding 12 as shown in FIG. 2.

I-type magnetic core 21 in a rectangular flat-sheet shape is then mounted from above insulating member 61 so that I-type magnetic core 21 extends over and is superposed on outer legs 22A, 22B and center leg 22C of E-type magnetic core 22.

In FIG. 8, the respective portions of insulating member 61 and first winding 11 for example that extend in the top-bottom direction in FIG. 8 from the bent portions have their top-bottom dimensions shown to be considerably shorter as compared with FIG. 2. This is for the reason that the top-bottom dimensions are adjusted in order to illustrate, in the drawing, the many members such as insulating members 63, 62 and second winding 12 in the form of overlapping each other in the top-bottom direction. The respective portions of windings 11, 12 for example extending in the top-bottom direction in FIG. 8 correspond to the respective portions of windings 11, 12 extending in the top-bottom direction in FIG. 2, although their top-bottom dimensions in FIG. 8 are shown to be shorter than those in FIG. 2. Actually, therefore, as shown in FIG. 2, the top-bottom dimension of the upwardly extending portion of first winding 11 for example is long enough to extend through a printed circuit board disposed above windings 11, 12. The top-bottom dimensions of other members are also actually longer then those shown in FIG. 8.

Functions and advantages of the power converter in the present embodiment are now described.

As described above, in power converter 100 including magnetic cores 21, 22 in the present embodiment, a plurality of windings that are specifically first winding 11 and second winding 12 are bent in S shape. Each first portion extending from the first bent portion and each second portion extending from the second bent portion are arranged to extend in the direction in which magnetic cores 21, 22 extend, which enables downsizing of transformer 10. In other words, the whole of power converter 100 including first winding 11 and second winding 12 can be downsized to substantially the same size as a structure made up of I-type magnetic core 21 and E-type magnetic core 22 superposed on each other.

In the present embodiment, each of first winding 11 and second winding 12 is bent to include a region located farthest out from magnetic cores 21, 22 relative to other regions of winding 11, 12. Specifically, as described above, each of the first portion of first winding 11 and the second portion of second winding 12 is located farther out from magnetic cores 21, 22 (than the other winding), and exposed outward. Heat generated from any of windings 11, 12 can therefore be dissipated into the external atmosphere from this outwardly exposed portion highly efficiently.

In FIG. 2, for example, the left surface of I-type magnetic core 21 and the right surface of E-type magnetic core are exposed outward. The topmost surface of I-type magnetic core 21 and the bottommost surface of E-type magnetic core 22 are also exposed outward. The surfaces of magnetic cores 21, 22 are thus partially exposed outward. Heat generated from any of magnetic cores 21, 22 can therefore be dissipated into the external atmosphere from this outwardly exposed portion highly efficiently.

Further, in the present embodiment, insulating members 61, 62, 63 are arranged to be sandwiched between first winding 11 and second winding 12 and between windings 11, 12 and magnetic cores 21, 22. Accordingly, the electrically insulating state between first winding 11 and second winding 12 and the electrically insulating state between windings 11, 12 and magnetic cores 21, 22 can be ensured.

In this way, power converter 100 of the present embodiment enables all of downsizing of transformer 10, electrical insulation between windings 11 and 12, and high dissipation of heat generated from windings 11, 12 and magnetic cores 21, 22.

Next, the electrical insulation property for each component of transformer 10 in the present embodiment is described. Referring again to FIG. 2, in power converter 100 in the present embodiment, between E-type magnetic core 22 and S-shaped second winding 12, insulating member 62 bent in L shape is sandwiched. E-type magnetic core 22 is thus electrically insulated from second winding 12. Between second winding 12 and first winding 11 both having S shape, S-shaped insulating member 63 is sandwiched. Second winding 12 is thus electrically insulated from first winding 11. Between the portion of E-type magnetic core 22 or I-type magnetic core 21 located directly above windings 11, 12 extending in the right-left direction in FIG. 2 and first winding 11 in S shape, insulating member 61 bent in L shape is sandwiched in FIG. 2. Accordingly, first winding 11 is electrically insulated from magnetic cores 21, 22 directly above first winding 11. Respective materials and thicknesses of insulating members 61, 62, 63 can be controlled to satisfy electrical insulation performance required between first winding 11, second winding 12, I-type magnetic core 21, and E-type magnetic core 22. The electrical insulation performance is defined as a withstand voltage of 2000 V that can be applied for one minute against electrical insulation between first winding 11 and second winding 12 for example. When insulating members 61, 62, 63 are made of a resin material having a withstand voltage of 10 kV/mm or more, for example, the thickness of the insulating members (particularly insulating member 63 between first winding 11 and second winding 12) can be 0.2 mm or more to achieve a desired withstand voltage.

Next, the heat dissipation property for each component of especially transformer 10 in the present embodiment is described. Heat generated from first winding 11, second winding 12, I-type magnetic core 21, and E-type magnetic core 22 is basically dissipated into the atmosphere from their surfaces exposed outward. Any region between two members that generate heat, for example, has no surface exposed outward, and therefore has lower heat dissipation property.

Referring again to FIG. 2, the second portion of first winding 11 for example is located between I-type magnetic core 21 and second winding 12, and therefore, dissipation of heat from this second portion is hindered. In contrast, the first portion of first winding 11 has the surface exposed outward, and therefore, high heat dissipation from this portion is exhibited. Therefore, particularly first winding 11 enables highly efficient heat dissipation from its first portion. Likewise, the first portion of second winding 12 for example is located between E-type magnetic core 22 and first winding 11, and therefore, dissipation of heat from this first portion is hindered. In contrast, the second portion of second winding 12 has the surface exposed outward, and therefore, high heat dissipation from this portion is exhibited. Therefore, particularly second winding 12 enables highly efficient heat dissipation from this second portion. Both first winding 11 and second winding 12 thus include respective regions that are exposed outward and enable highly efficient heat dissipation, and accordingly high heat dissipation from both windings 11 and 12 is exhibited.

Second Embodiment

Figure 9:
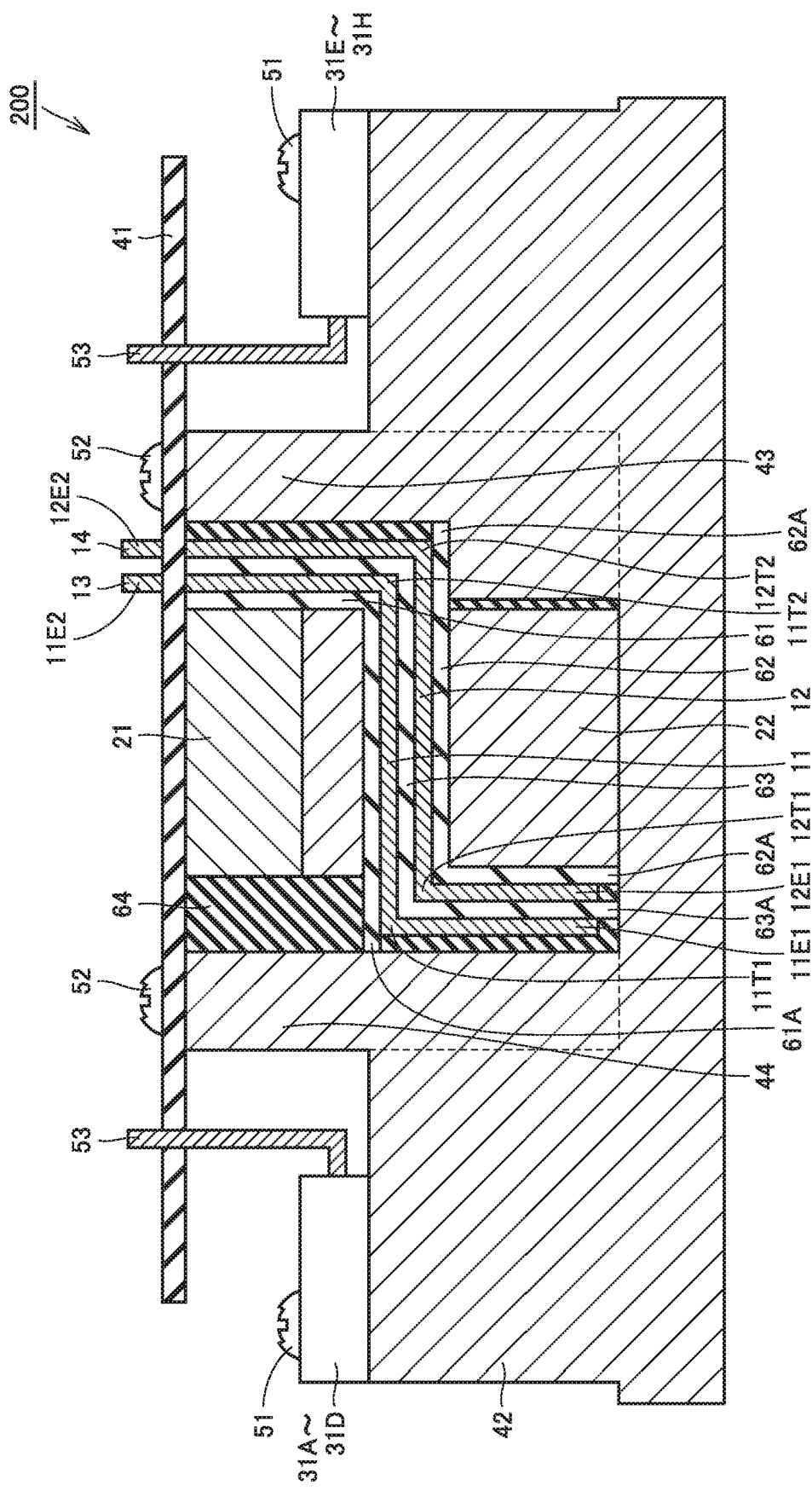
FIG. 9 is a schematic cross-sectional view showing a configuration of a power converter in a first example of a second embodiment.
Figure 10:
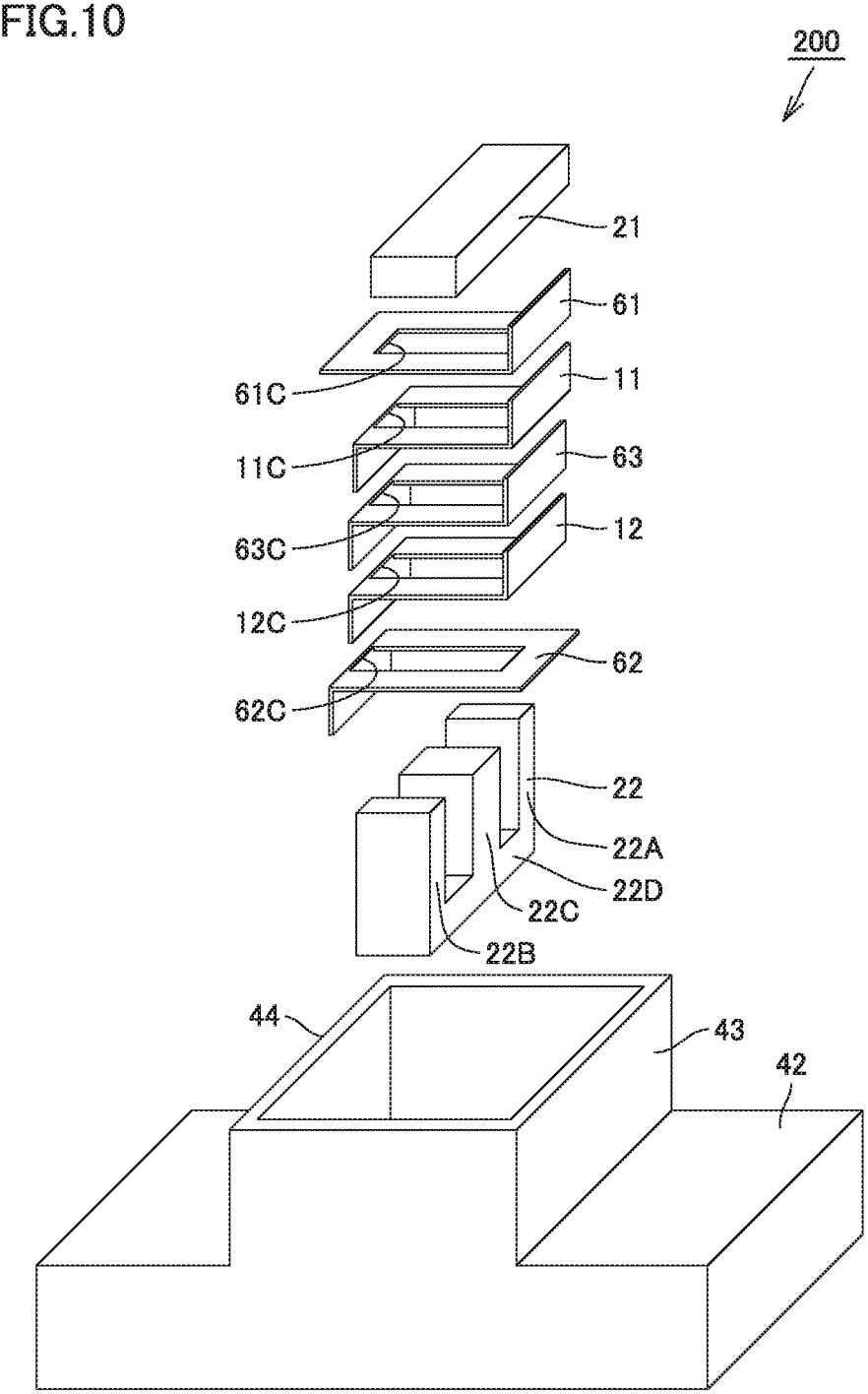
FIG. 10 is an exploded perspective view showing the configuration of the power converter in the first example of the second embodiment shown in FIG. 9.

Using FIGS. 9 and 10, a description is given of a specific configuration of a power converter in a first example of the present embodiment.

Referring to FIG. 9, a power converter 200 in the first example of the present embodiment differs from power converter 100 in the first embodiment in that the former further includes a printed circuit board 41, a casing 42, sidewalls 43, 44, and a high-heat-dissipation insulating member 64, for example.

In the present embodiment, a plurality of sidewalls 43, 44 are arranged as a part of casing 42. In other words, casing 42 and a plurality of sidewalls 43, 44 constitute a single body. Sidewall 43 is a region located outward (rightward) of elements such as magnetic cores 21, 22 and windings 11, 12 in FIG. 9, and extending in a columnar shape in the top-bottom direction (vertical direction) in FIG. 9 like I-type magnetic core 21 and E-type magnetic core 22. Likewise, sidewall 44 is a region located outward (leftward) of elements such as the magnetic cores 21, 22 and windings 11, 12 in FIG. 9, and extending in a columnar shape in the top-bottom direction (vertical direction) in FIG. 9 like I-type magnetic core 21 and E-type magnetic core 22. The dotted line in FIG. 9 indicates the boundary between sidewalls 43, 44 of casing 42 and other regions. Casing 42 may be formed through die casting of aluminum, for example, to constitute a single body together with sidewalls 43, 44.

Printed circuit board 41 is a flat-sheet-shaped member serving as a base on which circuits and elements for example included in the whole power converter 100 are mounted and implemented. Specifically, to printed circuit board 41, semiconductor elements such as switching elements 31A to 31D and rectifying elements 31E to 31H shown in FIG. 1 are electrically connected. To printed circuit board 41, capacitors 32A, 32B shown in FIG. 1 (not shown in FIG. 9) as well as elements such as other electronic components are also electrically connected. More specifically, switching elements 31A to 31D and rectifying elements 31E to 31H are secured to casing 42 with screws 51, and electrically connected to printed circuit board 41 through an interconnection 53. Printed circuit board 41 is secured to casing 42 with screws 52, particularly to sidewalls 43, 44 in FIG. 9. Sidewalls 43, 44 thus serve as columns for securing printed circuit board 41 to casing 42 with screws 52.

In the first example of the present embodiment, E-type magnetic core 22 is mounted on a part of the region of casing 42, and I-type magnetic core 21 is mounted to be superposed on E-type magnetic core 22 as seen in plan view (as seen from above in FIG. 9).

The part of casing 42 other than sidewalls 43, 44 serves as a heat dissipater. Specifically, elements such as E-type magnetic core 22 are mounted on a part of the region of casing 42, and thus casing 42 is disposed in contact with one end face (lower end face in FIG. 9) of E-type magnetic core 22 in the direction in which E-type magnetic core 22 extends (top-bottom direction in FIG. 9). The bottom region for example of casing 42 is cooled by air or water, for example, to enable highly efficient dissipation, to the outside, of heat generated from components of transformer 10 and switching elements 31A to 31D for example that are in contact with casing 42.

As described above, a plurality of sidewalls 43, 44 are formed to constitute a single body together with casing 42. Sidewalls 43, 44 are therefore basically made of metal such as aluminum and have the heat dissipation property.

The first portion is located leftward of E-type magnetic core 22 in FIG. 9, and the second portion is located rightward of E-type magnetic core 22 and I-type magnetic core 21 in FIG. 9. Respective second portions of first winding 11 and second winding 12 extend through printed circuit board 41 and thereby electrically connect to printed circuit board 41 (to electrode pads or the like (not shown) formed on printed circuit board 41).

In the present embodiment as well, as shown in FIG. 9, as a result of the bending in S shape, the first portion of first winding 11 is located outside the first portion of second winding 12, with respect to magnetic cores 21, 22. The second portion of second winding 12 is located outside the second portion of first winding 11, with respect to magnetic cores 21, 22.

Magnetic cores 21, 22 around which first winding 11 and second winding 12 are wound are mounted on casing 42 and particularly located in a region between a pair of sidewalls 43, 44 serving as support columns. High-heat-dissipation insulating member 64 is disposed outside a plurality of windings (first winding 11 and second winding 12) so as to be in contact with each of a plurality of sidewalls 43, 44 and each of first winding 11 and second winding 12. Therefore, each of the two windings includes a region (the first portion of first winding 11 and the second portion of second winding 12) located outward of the other winding, and this region is in contact with high-heat-dissipation insulating member 64 located outward of this region.

High-heat-dissipation insulating member 64 is disposed in the region between I-type magnetic core 21/E-type magnetic core 22 (higher than the region in which first winding 11 and second winding 12 extend horizontally) and sidewall 44 located leftward of I-type and E-type magnetic cores 21, 22, and disposed in the region between E-type magnetic core 22 (lower than the region in which first winding 11 and second winding 12 extend horizontally) and sidewall 43 located rightward of E-type magnetic core 22. In other words, high-heat-dissipation insulating member 64 is disposed between sidewalls 43, 44 and magnetic cores 21, 22, so that each of sidewalls 43, 44 and magnetic cores 21, 22 is at least partially in contact with high-heat-dissipation insulating member 64.

High-heat-dissipation insulating member 64 is also disposed in the region between the first portion of first winding 11 and sidewall 44 located outside, namely leftward of the first portion, and disposed in the region between the second portion of second winding 12 and sidewall 43 located outside, namely rightward of the second portion. In other words, high-heat-dissipation insulating member 64 is disposed between sidewalls 43, 44 and first and second windings 11, 12, so that each of sidewalls 43, 44 and first and second windings 11, 12 is at least partially in contact with high-heat-dissipation insulating member 64.

In other words, each of a plurality of windings 11, 12 includes a region located farthest out among the windings, and this region is in contact with casing 42 (sidewalls 43, 44) serving as a heat dissipater, through high-heat-dissipation insulating member 64. Regarding first winding 11, the region located farthest out is the first portion. Regarding second winding 12, the region located farthest out is the second portion.

In still other words, high-heat-dissipation insulating member 64 is disposed on only the outside of each of first winding 11, second winding 12, and magnetic cores 21, 22. The feature that high-heat-dissipation insulating member 64 is disposed on the outside of first winding 11/second winding 12 herein means that, at a position (coordinates) with respect to the top-bottom direction in FIG. 9, high-heat-dissipation insulating member 64 is located outward of first winding 11/second winding 12 with respect to magnetic core(s) 21, 22. In a region directly above respective first portions of first and second windings 11, 12, for example, high-heat-dissipation insulating member 64 may be partially located somewhat inside first winding 11 and second winding 12. This arrangement, however, is herein not regarded as an arrangement in which high-heat-dissipation insulating member 64 is located inside first winding 11 and second winding 12. Each of the two windings, namely first winding 11 and second winding 12, having the first and second bent portions is disposed partially in contact with high-heat-dissipation insulating member 64. Specifically, the first portion of first winding 11 is disposed in contact with high-heat-dissipation insulating member 64, and the second portion of second winding 12 is disposed in contact with high-heat-dissipation insulating member 64.

High-heat-dissipation insulating member 64 is higher in thermal conductivity than insulating members 61, 62, 63. Specifically, when the aforementioned resin material is used for insulating members 61, 62, 63, for example, the thermal conductivity of the insulating members is generally 0.3 W/mK or less. High-heat-dissipation insulating member 64 has a higher thermal conductivity than this, and particularly it is preferable that high-heat-dissipation insulating member 64 has a thermal conductivity of 0.5 W/mK or more.

Preferably, high-heat-dissipation insulating member 64 is formed of a material having high electrical insulation property as well as fluidity that basically enables the material to be fed to fill the gap between first winding 11 and sidewall 43 for example. Specifically, high-heat-dissipation insulating member 64 is preferably formed of a composition of a mixture of an insulating filler and an epoxy-based resin or silicone-based resin satisfying the aforementioned thermal conductivity, electrical insulation, and fluidity.

Using the exploded perspective view of FIG. 10, a description is given of a method for assembling power converter 200 shown in FIG. 9. Referring to FIG. 10, a pair of sidewalls 43, 44 facing each other is mounted on casing 42 (on a region of casing 42 except for sidewalls 43, 44). These sidewalls 43, 44 and a pair of other walls facing each other and extending in the direction orthogonal to sidewalls 43, 44 as seen in plan view form a region surrounding, on the four sides, cores 21, 22 for example described later herein. The region surrounding them on the four sides and casing 42 (the region of casing 42 except for the sidewalls) form a single body.

E-type magnetic core 22 for example is then placed in a region with its four sides surrounded by the walls including sidewalls 43, 44. E-type magnetic core 22 is preferably mounted in such a manner that core coupling portion 22D is a bottommost part and outer legs 22A, 22B and center leg 22C protrude upward from core coupling portion 22D.

Subsequently, as in the first embodiment, insulating member 62, second winding 12, insulating member 63, first winding 11, and insulating member 61 that are bent in advance are stacked in this order in such a manner that they are wound around center leg 22C. Center leg 22C also extends through openings 62C, 12C, 63C, 11C, 61C.

I-type magnetic core 21 in a rectangular flat-sheet shape is then mounted from above insulating member 61 so that I-type magnetic core 21 extends over and is superposed on outer legs 22A, 22B and center leg 22C of E-type magnetic core 22. After this, high-heat-dissipation insulating member 64 (not shown) that is a material satisfying the aforementioned high thermal conductivity, electrical insulation, and flowability is fed into the region surrounded, on four sides, by the walls including sidewalls 43, 44. In this way, the gaps in the region surrounded on the four sides are filled with high-heat-dissipation insulating member 64 as shown in FIG. 9.

Printed circuit board 41 which is not shown in FIG. 10 but shown for example in FIG. 9 is then secured with screws 52 to sidewalls 43, 44. First winding 11 is drawn upward through printed circuit board 41 to form extension 13, and second winding 12 is drawn upward through printed circuit board 41 to form extension 14. Extensions 13, 14 are secured to printed circuit board 41 by generally known soldering or the like. Further, as shown in FIG. 9, interconnection 53 extending from switching elements 31A to 31D for example is passed through printed circuit board 41 and soldered, for example to be secured to printed circuit board 41.

Power converter 200 in the first example of the present embodiment differs from power converter 100 in the first embodiment in the above-described respects. In other respects, the present embodiment is substantially identical in configuration to the first embodiment. Therefore, the same elements are denoted by the same reference characters, and the description thereof will not be repeated.

Functions and advantages of the power converter in the first example of the present embodiment are now described.

The present embodiment provides functions and advantages as described below, in addition to those similar to the first embodiment.

Each of first winding 11 and second winding 12 in the first embodiment includes a portion located outward and exposed outward (region located farthest out) with respect to magnetic cores 21, 22 (relative to the other winding), and this portion in the present embodiment is in contact with casing 42 (sidewalls 43, 44) serving as a heat dissipater, through high-heat-dissipation insulating member 64. Heat generated from windings 11, 12 can therefore be dissipated highly efficiently from high-heat-dissipation insulating member 64 to sidewalls 43, 44. Sidewalls 43, 44 form a single body together with casing 42, and therefore also serve as a heat dissipater like casing 42. High-heat-dissipation insulating member 64 having a thermal conductivity of 0.5 W/mK or more can ensure improvement of the heat dissipation from high-heat-dissipation insulating member 64 to sidewalls 43, 44. High-heat-dissipation insulating member 64 is disposed on only the outside of windings 11, 12, and each of windings 11, 12 includes at least a portion (first or second portion located outward of the other winding 11/12) placed in contact with high-heat-dissipation insulating member 64. In the present embodiment, therefore, each of windings 11, 12 includes a region located outward relative to the other winding, and the high-heat-dissipation member is disposed in contact with the outer surface of the aforementioned region. Accordingly, heat generated from windings 11, 12 can be dissipated highly efficiently from high-heat-dissipation insulating member 64 to sidewalls 43, 44.

In the present embodiment, high-heat-dissipation insulating member 64 is particularly disposed on only the outside of first and second portions of windings 11, 12, for example. Specifically, high-heat-dissipation insulating member 64 is disposed on only the outside of the first portions of windings 11, 12 with respect to cores 21, 22, while no high-heat-dissipation insulating member 64 is disposed on the inside (core 21/22-side) of the first portions of windings 11, 12, for example. Likewise, high-heat-dissipation insulating member 64 is disposed on only the outside of the second portions of windings 11, 12. Accordingly, the manufacture cost for the material for high-heat-dissipation insulating member 64 can be reduced, as compared with the case where high-heat-dissipation insulating member 64 is also disposed on the inside of the first and second portions.

Particularly E-type magnetic core 22 has one (lower) end in the direction in which E-type magnetic core 22 extends and this end is disposed in contact with casing 42 serving as a heat dissipater. A part of E-type magnetic core 22 is thus in direct contact with casing 42, which increases the efficiency of dissipating heat from E-type magnetic core 22 to casing 42. I-type magnetic core 21 and E-type magnetic core 22 are partially connected to sidewalls 43, 44 with high-heat-dissipation insulating member 64 in between. A part of heat generated from magnetic cores 21, 22 can thus be dissipated speedily to sidewalls 43, 44 through high-heat-dissipation insulating member 64.

In the first example of the present embodiment, sidewalls 43, 44 form a single body together with casing 42, which facilitates heat conduction from sidewalls 43, 44 to casing 42 and accordingly enables further enhancement of heat dissipation from windings 11, 12.

As seen from the foregoing, power converters 100, 101 in the present embodiment enable all of downsizing of transformer 10, electrical insulation between windings 11, 12, and high dissipation of heat generated from windings 11, 12 and magnetic cores 21, 22.

Next, the electrical insulation property for each component of transformer 10 in the present embodiment is described. E-type magnetic core 22 having its lower end contacting casing 42 has the same potential as casing 42. Like the first embodiment, the present embodiment also enables required electrical insulation between members such as first winding 11, second winding 12, I-type magnetic core 21, and E-type magnetic core 22 to be satisfied by means of insulating members 61, 62, 63.

Referring again to FIG. 9, a leftmost end 61A of insulating member 61 extending in the right-left direction in FIG. 9 is formed to extend leftward in FIG. 9 further than the first portion of first winding 11. A rightmost end 62A of insulating member 62 extending in the right-left direction in FIG. 9 is formed to extend rightward in FIG. 9 further than the second portion of second winding 12. A bottommost end 62A of insulating member 62 extending in the top-bottom direction in FIG. 9 is formed to extend downward in FIG. 9 further than the bottommost part of the first portion of second winding 12. A bottommost end 63A of insulating member 63 extending in the top-bottom direction in FIG. 9 is formed to extend downward in FIG. 9 further than the bottommost part of the first portion of second winding 12.

Since ends 61A, 62A, 63A thus protrude relative to windings 11, 12, gaps are formed between ends 61A, 62A, 63A and adjacent windings 11, 12. The gaps are filled with a high-fluidity material forming high-heat-dissipation insulating member 64 after members such as windings 11, 12 forming transformer 10 are placed in the region surrounded by sidewalls 43, 44. High-heat-dissipation insulating member 64 has heat dissipation property as well as electrical insulation property. Therefore, the region of high-heat-dissipation insulating member 64 sandwiched between first winding 11 and sidewall 44 for example can ensure high heat dissipation property as well as high electrical insulation property. The thickness of high-heat-dissipation insulating member 64 fed in the gaps is substantially equal to the dimension of the portion of each end 61A, 62A, 63A extending in the direction in which insulating member 61, 62, 63 extends in FIG. 9. The length of ends 61A, 62A, 63A in the direction in which the ends extend can be controlled to thereby control the thickness of high-heat-dissipation insulating member 64 and control electrical insulation property provided by high-heat-dissipation insulating member 64.

Next, the heat dissipation property for each component of transformer 10 in the first example of the present embodiment is described. E-type magnetic core 22 has a path through which heat is directly dissipated to casing 42 from the lower surface of core 22 that contacts casing 42, and a path through which heat is dissipated to sidewall 43 through high-heat-dissipation insulating member 64. I-type magnetic core 21 has a path through which heat is dissipated to sidewall 44 through high-heat-dissipation insulating member 64. The amount of heat generated from I-type magnetic core 21 and E-type magnetic core 22 that form a magnetic component is proportional to the volume of cores 21, 22. Then, magnetic core 21 having only one heat dissipation path is formed as I-type core and magnetic core 22 having two heat dissipation paths is formed as E-type core. Accordingly, the volume of E-type magnetic core 22 having two heat dissipation paths can be made larger than the volume of I-type magnetic core 21 having only one heat dissipation path.

Heat of first winding 11 is dissipated from its first portion in the lower left part in FIG. 9 to sidewall 44 through high-heat-dissipation insulating member 64. Heat of second winding 12 is dissipated from its second portion in the upper right part in FIG. 9 to sidewall 43 through high-heat-dissipation insulating member 64. Sidewall 43 is relatively long in the dimension in the top-bottom direction in FIG. 9. Therefore, in order to predominantly increase the efficiency of dissipating heat from the second portion of second winding 12 through sidewall 43, for example, sidewall 43 may be formed to have a greater width in the right-left direction in FIG. 9 in its lower portion (region lower than windings 11, 12 extending in the right-left direction in FIG. 9), relative to its upper portion. In contrast, sidewall 44 in FIG. 9 is not formed in such a manner. In this way, the efficiency of dissipating heat from the second portion of second winding 12 through sidewall 43 to the lower portion of casing 42 can be further increased.

Insulating members 61, 62, 63 are lower in heat dissipation property (thermal conductivity) than high-heat-dissipation insulating member 64. Insulating members 61, 62, 63 are not required to have high heat dissipation property like that of high-heat-dissipation insulating member 64. The degree of freedom in selecting the material for insulating members 61, 62, 63 can therefore be increased. Insulating members 61, 62, 63 can thus be formed of a material of a lower cost than the material for high-heat-dissipation insulating member 64, and the overall cost of power converter 200 can be reduced. As the degree of freedom in selecting the material for insulating members 61, 62, 63 is increased, it is not necessarily required to increase adhesion between windings 11, 12 and magnetic cores 21, 22 and insulating members 61, 62, 63, for example, which eliminates the need to use an adhesive for bonding them.

Figure 11:
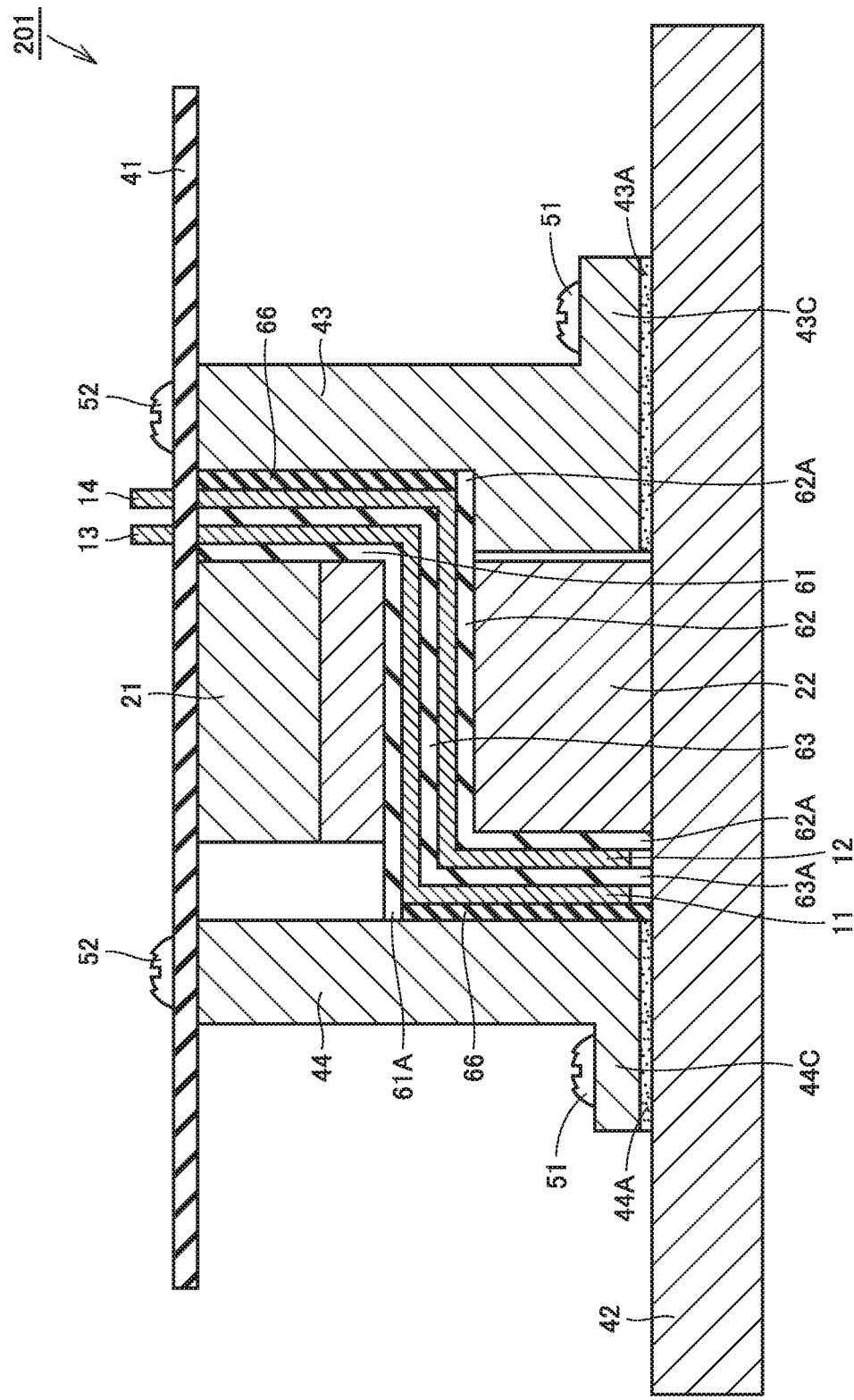
FIG. 11 is a schematic cross-sectional view showing a configuration of a power converter in a second example of the second embodiment.
Figure 12:
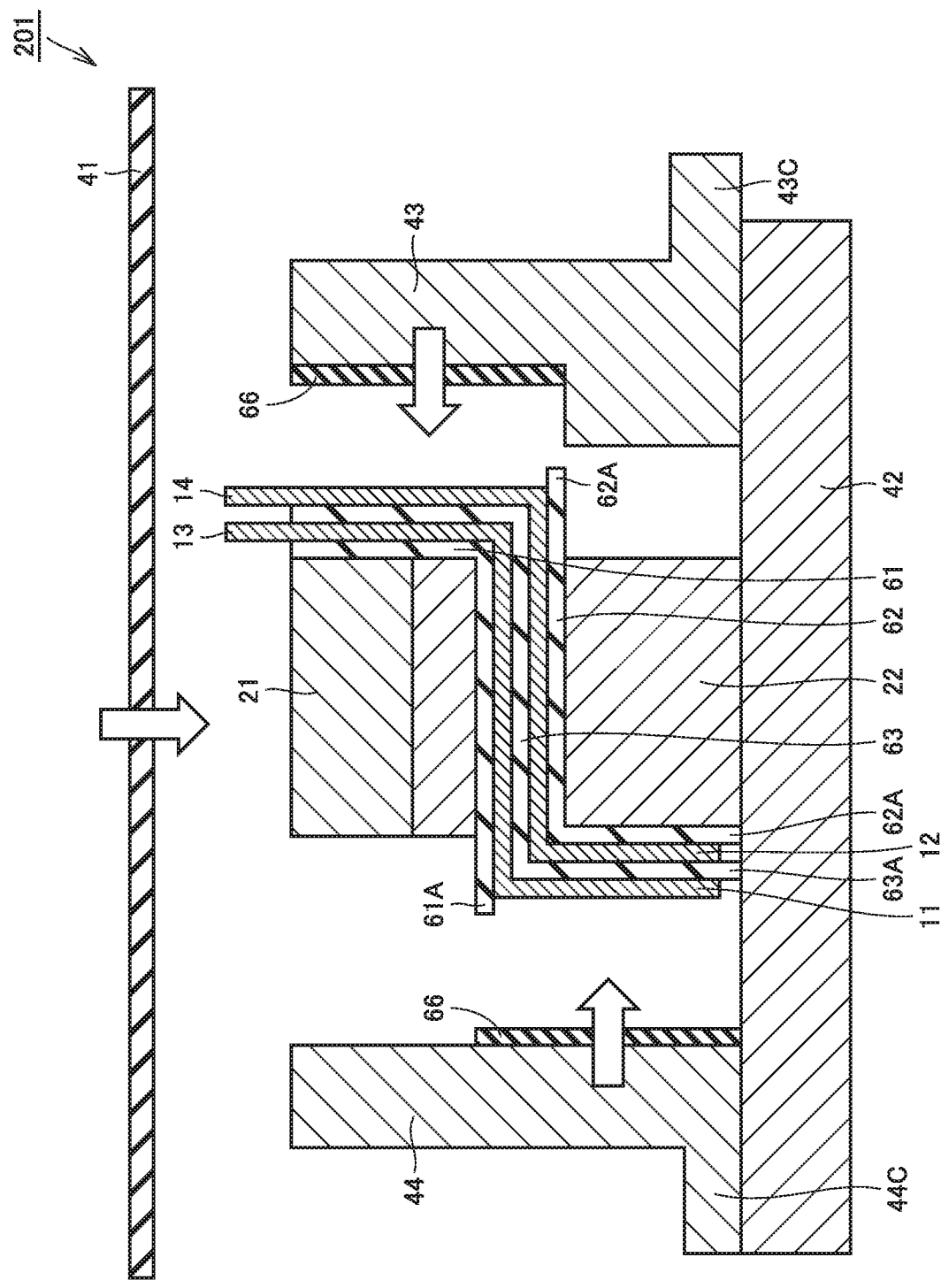
FIG. 12 is a schematic cross-sectional view illustrating a method for assembling the power converter in the second example of the second embodiment shown in FIG. 11.

Using FIGS. 11 and 12 next, a description is given of a specific configuration of a power converter in a second example of the present embodiment.

Referring to FIG. 11, a power converter 201 in the second example of the present embodiment basically has a configuration similar to power converter 200 in the first example. In power converter 201, however, casing 42 and sidewalls 43, 44 do not form a single body but are separate from each other. Specifically, casing 42 serving as a heat dissipater is disposed in only the region located lower in FIG. 11 than E-type magnetic core 22. Sidewalls 43, 44 extending in the top-bottom direction in FIG. 11 are disposed so that respective (lower) end faces in this direction are in contact with casing 42. Sidewalls 43, 44 on casing 42 are secured onto the topmost surface of casing 42 with screws 51.

Like the first example, sidewall 43 is particularly larger in width in the right-left direction in FIG. 11 in its region located lower in FIG. 11 than its region located in contact with high-heat-dissipation insulating member 64, relative to the width of the other region. In FIG. 11, sidewall 44 is also larger in width in its lower region, like sidewall 43.

Specifically, in the second example, casing 42 serving as a heat dissipater is disposed in contact with respective (lower) end faces of E-type magnetic core 22 and a plurality of sidewalls 43, 44 in the top-bottom direction in which core 22 and sidewalls 43, 44 extend in FIG. 11. A plurality of sidewalls 43, 44 include joint portions 43C, 44C. Joint portions 43C, 44C are included in bottommost portions located in contact with casing 42. Joint portions 43C, 44C protrude in the direction (right-left direction in FIG. 11) traversing the direction (top-bottom direction) in which sidewalls 43, 44 extend, relative to the regions other than the bottommost portions.

In the second example, an insulating member sheet 66 that is a high-heat-dissipation insulating member is disposed in the region between sidewall 44 and the first portion of first winding 11 (outside second winding 12). In the first example, high-heat-dissipation insulating member 64 is disposed in this region. Likewise, in the second example, insulating member sheet 66 that is a high-heat-dissipation insulating member is also disposed in the region between sidewall 43 and the second portion of second winding 12 (outside first winding 11). In the first example, high-heat-dissipation insulating member 64 is disposed in this region. In other words, in the second example, insulating member sheet 66 is disposed outside a plurality of windings 11, 12 so that insulating member sheet 66 is in contact with each of a plurality of sidewalls 43, 44 and each of a plurality of windings 11, 12.

Insulating member sheet 66 is a sheet-type member that is soft and higher in thermal conductivity than insulating members 61, 62, 63.

In the first example, high-heat-dissipation insulating member 64 is disposed in the region located higher than windings 11, 12 extending in the right-left direction in FIG. 9 and located between sidewall 44 and I-type magnetic core 21 and a part of E-type magnetic core 22. Likewise, in the first example, high-heat-dissipation insulating member 64 is also disposed in the region located lower than windings 11, 12 extending in the right-left direction in FIG. 9 and located between sidewall 43 and a part of E-type magnetic core 22. In the second example, however, none of high-heat-dissipation insulating member 64 and insulating member sheet 66 is disposed in these regions, and gaps are formed instead.

Power converter 201 in the second example differs from power converter 200 in the first example in the above-described respects. In other respects, the second example is substantially identical in configuration to the first example. Therefore, the same elements are denoted by the same reference characters, and the description thereof will not be repeated.

Using the schematic cross-sectional view of FIG. 12, a general description is given of a method for assembling power converter 201 shown in FIG. 11. Referring to FIG. 12, E-type magnetic core 22 is first mounted on a part of the topmost surface of casing 42, in such a manner that core coupling portion 22D is the bottommost portion and outer legs 22A, 22B and center leg 22C protrude upward from core coupling portion 22D.

Next, like the first embodiment for example, insulating member 62, second winding 12, insulating member 63, first winding 11, and insulating member 61 are stacked in this order in such a manner that they are wound around center leg 22C and these insulating members and windings are each bent in advance at desired first and second bent portions (for example, dashed-dotted line F1 and dotted line F2) to form a so-called S shape. Like the first embodiment for example, center leg 22C extends through each of openings 62C, 12C, 63C, 11C, 61C. After this, I-type magnetic core 21 in a rectangular flat-sheet shape is mounted from above insulating member 61 in such a manner that I-type magnetic core 21 extends over outer legs 22A, 22B and center leg 22C of E-type magnetic core 22 and overlaps them.

Next, as shown in FIG. 12, sidewalls 44, 43 are secured onto a part of the topmost surface of casing 42 with screws 51 (see FIG. 11). On each of sidewalls 44, 43, insulating member sheet 66 is attached to a partial region (lower region of sidewall 44, upper region of sidewall 43) of one surface (inner surface in the finally set state). At this time, sidewalls 43, 44 are secured to casing 42 in such a manner that insulating member sheet 66 is pressed against, in the directions indicated by the arrows in FIG. 12, and in contact with respective top surfaces of the first portion of first winding 11 and the second portion of second winding 12 that are mounted beforehand.

The material forming insulating member sheet 66 is a sheet-shaped member that is soft and higher in thermal conductivity (than insulating members 61, 62, 63), and the material is selected based on the thermal conductivity and the withstand voltage. For example, insulating member sheet 66 is formed from a low-hardness heat-dissipation silicone rubber having a thermal conductivity of 1.8 W/mK or more and a withstand voltage of 22 kV/mm or more, for example. Alternatively, insulating member sheet 66 may be formed by a heat-dissipation spacer having a thermal conductivity of 1 W/mK or more and a withstand voltage of 10 kV/mm or more.

Further, as shown in FIG. 12, printed circuit board 41 is mounted on the top surfaces of sidewalls 44, 43 and fixed with screws 52 (see FIG. 11). At this time, preferably respective topmost portions of first winding 11 and second winding 12 are drawn through printed circuit board 41 to form extensions 13, 14 protruding upward from printed circuit board 41.

Referring to FIG. 12, the first portion (lower left portion) of first winding 11 and the second portion (upper right portion) of second winding 12 are originally (at the time they are set on casing 42) arranged to extend in the direction (top-bottom direction in FIG. 12) substantially perpendicular to the main surface of casing 42. However, another method may be used. Specifically, before sidewalls 43, 44 are pressed against windings 11, 12, for example, the first portion (lower left portion) of first winding 11 and the second portion (upper right portion) of second winding 12 may extend obliquely to the main surface of casing 42 (so that they are inclined toward sidewalls 43, 44) and thereafter sidewalls 43, 44 may be pressed against windings 11, 12 to cause windings 11, 12 to extend in the perpendicular direction. In this way, the contact pressure applied from sidewalls 43, 44 to press insulating member sheet 66 against windings 11, 12 can be increased. Accordingly, the contact thermal resistance of the surface of insulating member sheet 66 contacting sidewalls 43, 44 and the surface of insulating member sheet 66 contacting first winding 11 and second winding 12 can be reduced.

Functions and advantages of the power converter in the second example are now described.

As described above, in the second example, heat is transferred from windings 11, 12 to sidewalls 43, 44 through high-heat-dissipation insulating member sheet 66 instead of high-heat-dissipation insulating member 64 in the first example. Therefore, like the first example, the effect of speedily dissipating heat from windings 11, 12 through sidewalls 43, 44 is ensured.

In the second example like the first example, windings 11, 12 are bent and insulating member 63 is disposed between windings 11 and 12. Accordingly, the second example also enables all of downsizing of the transformer, electrical insulation, and heat dissipation.

In the second example, sidewalls 43, 44 are separate members from casing 42. The bottommost portions of sidewalls 43, 44 include joint portions 43C, 44C protruding in the right-left direction in FIG. 11 relative to other regions. Accordingly, the area of the joint between sidewalls 43, 44 and casing 42 can be increased, and therefore, heat can be efficiently transferred from sidewalls 43, 44 to casing 42.

In the second example, high-heat-dissipation insulating member 64 and high-heat-dissipation insulating member sheet 66 are not disposed between I-type magnetic core 21/E-type magnetic core 22 and sidewalls 43, 44, and gaps are formed instead. In the second example, particularly in order to enable heat to be dissipated predominantly from windings 11, 12, both windings 11, 12 are in contact with sidewalls 43, 44 through insulating member sheet 66. In this way, the amount of high-heat-dissipation insulating member 64 and high-heat-dissipation insulating member sheet 66 having high heat dissipation property can be reduced, and accordingly the manufacture cost can be reduced, as compared with the first example.

Next, the electrical insulation property for each component of transformer 10 in the second example is described.

Referring to FIG. 11, in the second example as well, leftmost end 61A of insulating member 61 extending in the right-left direction in FIG. 11 is formed to extend leftward in FIG. 11 further than the first portion of first winding 11. Rightmost end 62A of insulating member 62 extending in the right-left direction in FIG. 11 is formed to extend rightward in FIG. 11 further than the second portion of second winding 12. Bottommost end 62A of insulating member 62 extending in the top-bottom direction in FIG. 11 is formed to extend downward in FIG. 11 further than the first portion of second winding 12. Bottommost end 63A of insulating member 63 extending in the top-bottom direction in FIG. 11 is formed to extend downward in FIG. 11 further than the first portion of second winding 12. Gaps are formed between these ends 61A, 62A, 63A and adjacent windings 11, 12. The gaps are filled with high-heat-dissipation insulating member 64 in the first example. In the second example, nothing is fed to the gaps and the size of the gaps satisfies the electrical insulation performance.

Insulating member sheet 66 is sandwiched between the first portion (lower left portion) of first winding 11 and sidewall 44 and between the second portion (upper right portion) of second winding 12 and sidewall 43. Insulating member sheet 66 is in contact with both first winding 11 and sidewall 44 to electrically insulate first winding 11 from sidewall 44. Insulating member sheet 66 is also in contact with both second winding 12 and sidewall 43 to electrically insulate second winding 12 from sidewall 43.

As described above, leftmost end 61A of insulating member 61 extending in the right-left direction in the drawing is formed to extend leftward in FIG. 11 further than the first portion of first winding 11. Sidewall 44 on which insulating member sheet 66 is formed can be pressed against the first portion of first winding 11 so that sidewall 44 is in contact with end 61A of insulating member 61. The thickness of insulating member sheet 66 corresponding to the length of end 61A can thus be ensured.

Rightmost end 62A of insulating member 62 extending in the right-left direction in the drawing is formed to extend rightward in FIG. 11 further than the second portion of second winding 12. Sidewall 43 on which insulating member sheet 66 is formed can be pressed against the second portion of second winding 12 so that sidewall 43 is in contact with end 62A of insulating member 62. The thickness of insulating member sheet 66 corresponding to the length of end 62A can thus be ensured.

Next, the heat dissipation property for each component of transformer 10 in the second example is described. In the first example, the gaps between casing 42/sidewalls 43, 44 and components of transformer 10 are filled by high-heat-dissipation insulating members 64. In the first example, therefore, paths are provided through which heat from E-type magnetic core 22 and I-type magnetic core 21 is dissipated to sidewalls 43, 44 through high-heat-dissipation insulating member 64.

In contrast, in the second example, the region between E-type magnetic core 22 and sidewall 43 and the region between I-type or E-type magnetic core 21/22 and sidewall 44 are not filled by high-heat-dissipation insulating member 64 or the like, and gaps are formed in these regions instead. The second example is therefore inferior to the first example in the heat dissipation from magnetic cores 21, 22.

However, if the amount of change of the magnetic flux density of I-type magnetic core 21 and E-type magnetic core 22 is small or the frequency at which the magnetic flux density changes is low, the loss of I-type magnetic core 21 and E-type magnetic core 22 is small. The configuration having gaps as shown in FIG. 11 can therefore be used.

As shown in FIG. 11, in the second example, sidewalls 43, 44 are members separate from casing 42, and the sidewalls and the casing are joined to each other by heat-dissipation greases 43A, 44A. Preferably, heat-dissipation greases 43A, 44A are applied to the portion where casing 42 is to be joined with respective bottommost parts of joint portions 43C, 44C in which the width of sidewalls 43, 44 is larger, for example. Since heat-dissipation greases 43A, 44A are thus supplied, the contact thermal resistance at the boundaries between joint portions 43C, 44C and casing 42 can be reduced and deterioration of the heat dissipation property can be suppressed.

Instead of cooling casing 42 under sidewalls 43, 44 by means of air cooling or water cooling, air may be blown onto the surfaces of sidewalls 43, 44 opposite to the surfaces thereof on which windings 11, 12 are disposed, to thereby directly cool sidewalls 43, 44 (air cooling).

Third Embodiment

Figure 13:
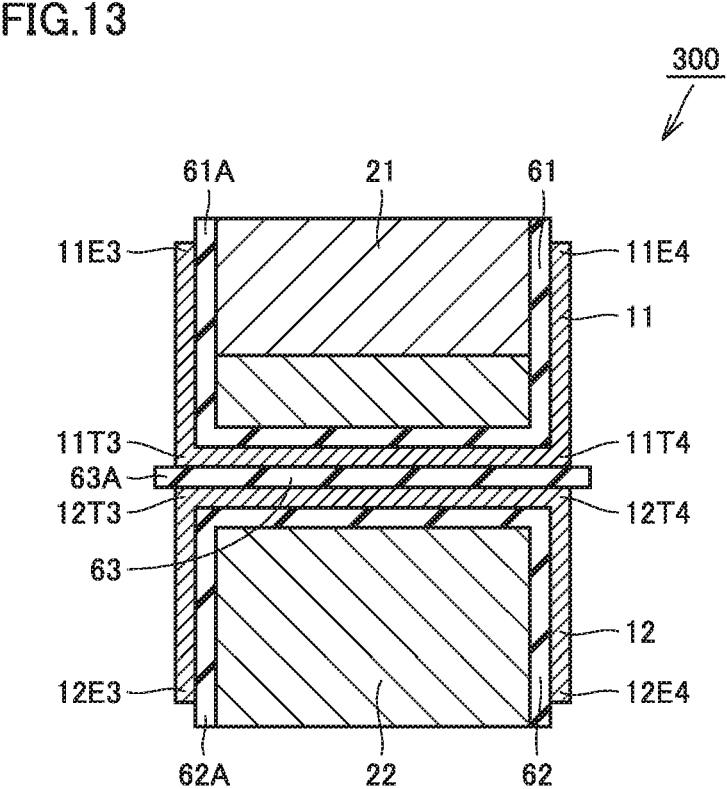
FIG. 13 is a schematic cross-sectional view showing a configuration of a power converter in a third embodiment.
Figure 14:
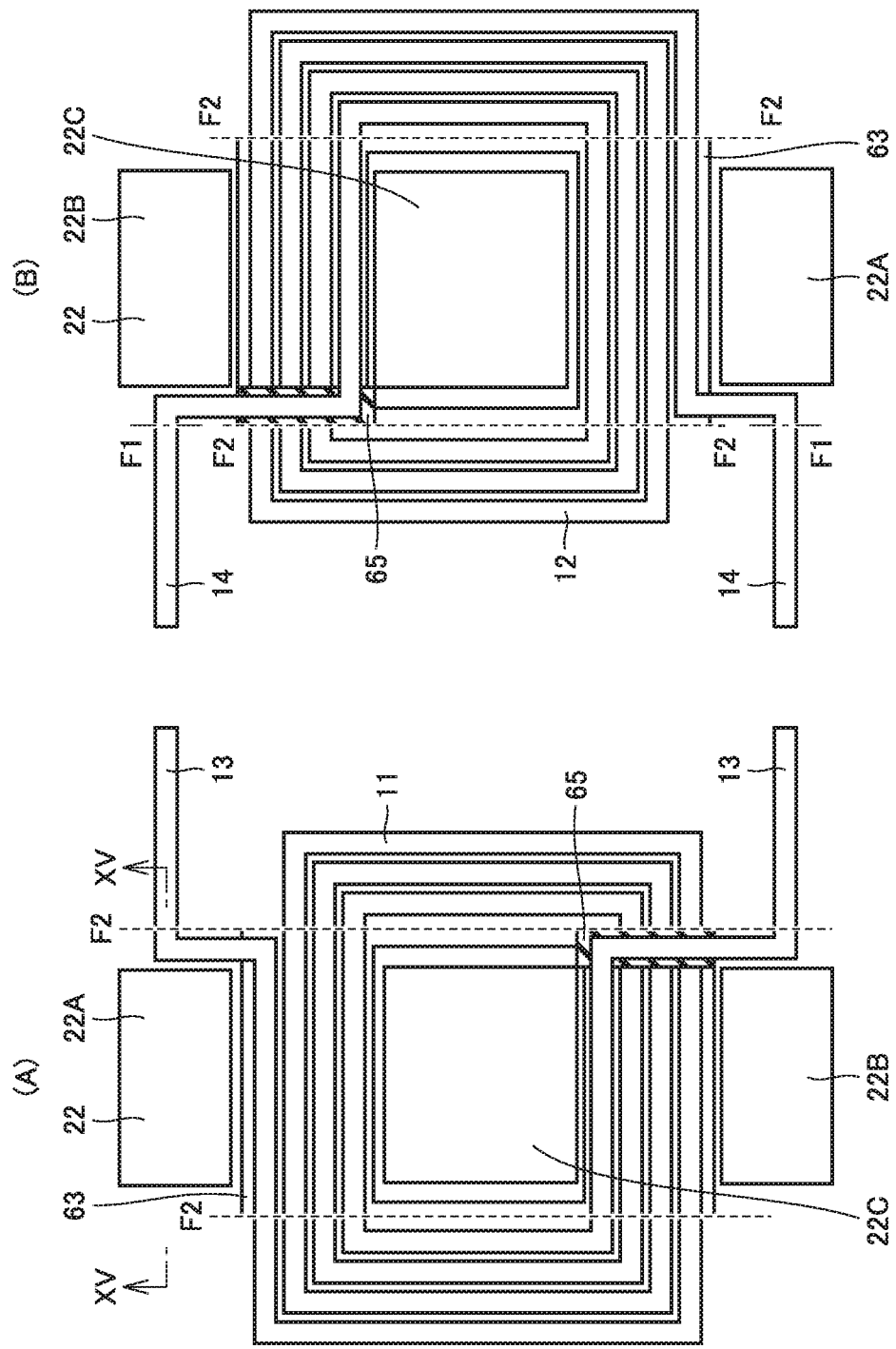
FIG. 14 shows a schematic plan view (A) of a first winding as seen from above the first winding, after the first winding wound around a center leg of a lower magnetic core is bent in the third embodiment, and a schematic plan view (B) of the second winding as seen from below the second winding, after the second winding wound around the center leg of the lower magnetic core is bent in the third embodiment.
Figure 15:
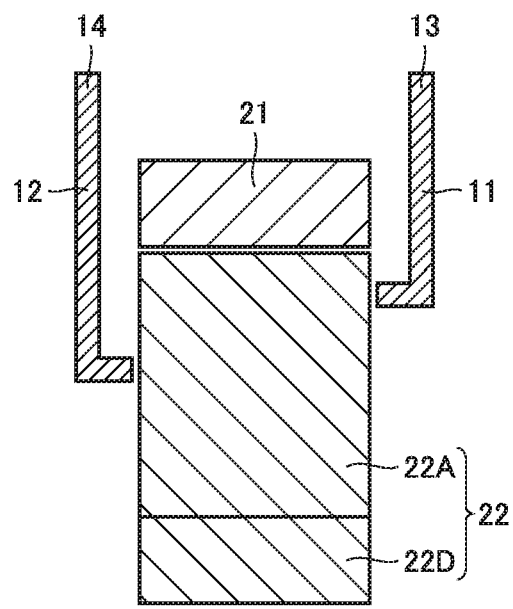
FIG. 15 is a schematic cross-sectional view along line XV-XV in FIG. 14, after the first and second windings are bent and assembled in the third embodiment.

Using FIGS. 13 to 15, a description is given of a specific configuration of a power converter in the present embodiment.

Referring to FIG. 13, a power converter 300 in the present embodiment differs from the power converters in the first and second embodiments in terms of the shape in which and the position at which first winding 11, second winding 12, and insulating members 61, 62, 63 are bent. Specifically, the directions in which bent portions of windings 11, 12 for example extend on one end and the other end in the cross section in FIG. 13 differ from the first embodiment, for example.

Two windings, namely first winding 11 and second winding 12 each have one end, specifically the end on the left side of magnetic cores 21, 22 in FIG. 13, and a bent portion (first bent portion) on the left side of magnetic cores 21, 22, and the region between the aforementioned one end and the first bent portion is herein referred to as a first portion. First winding 11 and second winding 12 each also have the other end opposite to the aforementioned one end, namely the end on the right side of magnetic cores 21, 22 in FIG. 13, and a bent portion (second bent portion) on the right side of magnetic cores 21, 22, and the region between the aforementioned other end and the second bent portion is herein referred to as second portion. The first bent portion corresponds to dashed-dotted line F2 on the left side of magnetic core 22 in FIGS. 14(A) and (B), and the second bent portion corresponds to dashed-dotted line F2 on the right side of magnetic core 22 in FIGS. 14(A) and (B).

In the present embodiment, the first portion of first winding 11 extends upward in FIG. 13 from the first bent portion, and the second portion of first winding 11 also extends upward in FIG. 13 from the second bent portion. The first portion of second winding 12 extends downward in FIG. 13 from the first bent portion, and the second portion of second winding 12 also extends downward in FIG. 13 from the second bent portion. In other words, the first portion and the second portion extend in the same direction. In FIG. 13, each of the two windings, namely first winding 11 and second winding 12, is bent in so-called C shape. Like the other embodiments, the direction in which the first and second portions extend is substantially in parallel with the direction in which I-type magnetic core 21 and E-type magnetic core 22 extend (top-bottom direction in FIG. 13).

Each of first winding 11 and second winding 12 also includes a third portion extending between the first portion and the second portion (the region between the first bent portion and the second bent portion). The third portion of first winding 11 and the third portion of second winding 12 overlap each other in the top-bottom direction in FIG. 13. The first portion of first winding 11 and the first portion of second winding 12 are coplanar in the top-bottom direction in FIG. 13. Likewise, the second portion of first winding 11 and the second portion of second winding 12 are coplanar in the top-bottom direction in FIG. 13.

In the cross section as shown in FIG. 13, first winding 11 has a topmost portion 11E3 and a topmost portion 11E4 in the direction in which magnetic cores 21, 22 extend (top-bottom direction in FIG. 13), and these topmost portions 11E3 and 11E4 are herein defined as one end and the other end, respectively. In the cross section in FIG. 13, first winding 11 has a bent portion relatively closer to topmost portion 11E3 and a bent portion relatively closer to topmost portion 11E4, and the former bent portion and the latter bent portion are defined herein as first bent portion 11T3 and second bent portion 11T4, respectively. The region between topmost portion 11E3 and first bent portion 11T3 is the first portion, and the region between second bent portion 11T4 and topmost portion 11E4 is the second portion. Likewise, in the cross section as shown in FIG. 13, second winding 12 has a bottommost portion 12E3 and a bottommost portion 12E4 in the direction in which magnetic cores 21, 22 extend (top-bottom direction in FIG. 13), and bottommost portions 12E3 and 12E4 are herein defined as one end and the other end, respectively. In the cross section in FIG. 13, second winding 12 has a bent portion relatively closer to bottommost portion 12E3 and a bent portion relatively closer to bottommost portion 12E4, and the former bent portion and the latter bent portion are defined herein as first bent portion 12T3 and second bent portion 12T4, respectively. The region between bottommost portion 12E3 and first bent portion 12T3 is the first portion, and the region between second bent portion 12T4 and bottommost portion 12E4 is the second portion.

The shape of the cross section in FIG. 13 corresponds to the plan views in FIGS. 14(A) and (B) where windings 11, 12 are bent along dashed-dotted line F1 and dotted line F2. In respective third portions of windings 11, 12, namely respective portions substantially overlapping magnetic cores 21, 22, the plane of first winding 11 and the plane of second winding 12 (planes formed by turns of the windings) substantially overlap each other. While respective first portions of windings 11, 12 are coplanar and respective second portions of windings 11, 12 are coplanar, the first portions do not overlap each other and the second portions do not overlap each other. In other words, in the cross section in FIG. 13, first winding 11 is superposed on second winding 12 in such a manner that the outer surfaces of respective third portions face each other.

Thus, the plane formed by turns of first winding 11 and the plane formed by turns of second winding 12 include respective partial regions that do not overlap each other. In this respect, the present embodiment differs from the first and second embodiments in which the plane formed by turns of first winding 11 and the plane formed by turns of second winding 12 are bent so that these planes substantially entirely overlap each other.

First winding 11 and second winding 12 of the first and second embodiments constitute transformer 10 (primary winding 15 and secondary winding 16) in FIG. 1. In this case, when the area of the region where respective planes formed by turns of first winding 11 and second winding 12 overlap (face) each other as shown in FIG. 13 for example is greater, reduction of the efficiency of power conversion between input-side drive circuit 1 and output-side drive circuit 2 is suppressed to a greater extent.

In the present embodiment, however, first winding 11 and second winding 12 are supposed to be coils of a different type from primary winding 15 and secondary winding 16 of transformer 10 in FIG. 1. In this case, when the region where first winding 11 and second winding 12 face each other is large, a parasitic capacitor is generated between windings 11 and 12, and therefore, the area where they face each other is preferably smaller. In view of this, respective first portions of first and second windings 11 and 12 do not overlap each other while they are coplanar, and respective second portions of first and second windings 11 and 12 do not overlap each other while they are coplanar.

The positions where insulating members 61, 62, 63 are disposed are basically similar to those in the first embodiment. Specifically, insulating member 63 is disposed in the region between first winding 11 and second winding 12. Insulating member 61 is disposed between first winding 11 and the magnetic core (I-type magnetic core 21 and E-type magnetic core 22). Insulating member 62 is disposed between second winding 12 and the magnetic core (E-type magnetic core 22). Therefore, insulating member 62, second winding 12, insulating member 63, first winding 11, and insulating member 61 are stacked in this order while they are wound around center leg 22C (see FIG. 4(C)) of E-type magnetic core 22 (E-type core). Insulating member 63 includes only the portion extending in the right-left direction in the cross section in FIG. 13 and is not bent. Insulating member 61 is bent in C shape like first winding 11 and second insulating member 62 is bent in C shape like second winding 12 in the cross section in FIG. 13.

Referring to FIG. 13 and FIGS. 14(A) and (B), the manner in which first winding 11 and second winding 12 in the present embodiment are wound around center leg 22C is basically similar to the manner in which they are wound in the first embodiment shown in FIGS. 2 and 3 (A) and (B). In the present embodiment, however, the directions in which first winding 11 and second winding 12 are bent at the first and second bent portions differ from those in the first embodiment. Specifically, first winding 11 and second winding 12 shown in FIG. 14 are bent rearward from the plane of FIG. 14 along dashed-dotted line F1 in FIG. 14, and bent frontward from the plane of FIG. 14 along dotted line F2 in FIG. 14. The first portion and the second portion of each of windings 11, 12 thus extend in the same direction (in C shape).

Extension 13 of first winding 11 and extension 14 of second winding 12 are formed by bending the windings frontward from the plane of FIG. 14(A) which is a view as seen from above, and rearward from the plane of FIG. 14(B) which is a view as seen from below. Consequently, referring to FIG. 15, both extensions 13 and 14 extend upward in FIG. 13, for example, and therefore can be drawn to protrude upward from a printed circuit board (not shown), for example. In order to form extensions 13, 14, insulating member 65 is disposed to allow each extension to cross first winding 11/second winding 12 wound around center leg 22C, without being short-circuited with first winding 11 and second winding 12.

Power converter 300 in the present embodiment differs from power converter 100 in the first embodiment in the above-described respects. In other respects, the present embodiment is substantially identical in configuration to the first embodiment. Therefore, the same elements are denoted by the same reference characters, and the description thereof will not be repeated.

Functions and advantages of the power converter in the present embodiment are now described.

In power converter 300 in the present embodiment, a plurality of windings, namely first winding 11 and second winding 12, are each bent in C shape. In this case, similarly to power converter 100 in which the windings are each bent in S shape, each first portion extending from the first bent portion and each second portion extending from the second bent portion are arranged to extend in the direction in which magnetic cores 21, 22 extend, which enables downsizing of transformer 10. In other words, the whole of power converter 300 including first winding 11 and second winding 12 can be downsized to substantially the same size as a structure made up of I-type magnetic core 21 and E-type magnetic core 22 superposed on each other.

In the present embodiment, each of first winding 11 and second winding 12 is bent to include a region located farthest out from magnetic cores 21, 22, among regions included in winding 11, 12. Specifically, as described above, respective first portions and respective second portions of first winding 11 and second winding 12 are each located farther out from magnetic cores 21, 22 and exposed outward. Heat generated from any of windings 11, 12 can therefore be dissipated into the external atmosphere from the outwardly exposed portions highly efficiently.

The first portion of first winding 11 and the first portion of second winding 12 are coplanar and the second portion of first winding 11 and the second portion of second winding 12 are coplanar, and therefore, insulating member sheet 66 is easily arranged in contact with both the first portion of first winding 11 and the first portion of second winding 12, similarly to an embodiment described later herein, for example.

In FIG. 13, second winding 12 is not disposed to overlap the first portion of first winding 11 as shown in FIG. 2 for example (at a certain position (coordinates) with respect to the top-bottom direction in FIG. 13). Although no winding is disposed outward/inward of other windings in this case, the winding is described herein as including a region located farthest out from the magnetic core(s) "among all of a plurality of windings." In FIG. 13, respective regions of first winding 11 and second winding 12 that extend in the top-bottom direction are disposed at the same position (coordinates) with respect to magnetic cores 21, 22 (in the right-left direction in FIG. 13), and winding 11 is not located outward of winding 12 and winding 12 is not located outward of winding 11. Accordingly, both first winding 11 and second winding 12 may be considered as being located farthest out from magnetic cores 21, 22.

In FIG. 13 for example, the topmost surface of I-type magnetic core 21 and the bottommost surface of E-type magnetic core 22 are exposed outward. Heat generated from magnetic cores 21, 22 can therefore be dissipated highly efficiently to the external atmosphere from the outwardly exposed portions.

In the present embodiment, insulating members 61, 62, 63 are also disposed between first winding 11 and second winding 12 and between windings 11, 12 and magnetic cores 21, 22. The electrically insulating state between first winding 11 and second winding 12 and the electrically insulating state between windings 11, 12 and magnetic cores 21, 22 can therefore be ensured.

As seen from the above, power converter 100 in the present embodiment enables all of downsizing of transformer 10, electrical insulation between windings 11 and 12, and high dissipation of heat generated from windings 11, 12 and magnetic cores 21, 22.

Next, the electrical insulation property for each component in the present embodiment is described. Electrical insulation between windings for example is provided by insulating members 61, 62, 63, which is basically similar to the first and second embodiments. Referring again to FIG. 13, in the present embodiment, topmost end 61A of insulating member 61 located leftward of magnetic cores 21, 22, for example, may be formed to protrude upward in FIG. 13 relative to the first portion of first winding 11. Bottommost end 62A of insulating member 62 located leftward of magnetic cores 21, 22, for example, may be formed to protrude downward in FIG. 13 relative to the first portion of second winding 12. Further, leftmost end 63A of insulating member 63 may be formed to protrude leftward in FIG. 13 relative to respective first portions of first winding 11 and second winding 12. Required electrical insulation performance between first winding 11, second winding 12, I-type magnetic core 21, and E-type magnetic core 22 can thus be satisfied.

Next, the heat dissipation property for each component in the present embodiment is described. Referring again to FIG. 13, in the present embodiment, respective surfaces of the first and second portions of first winding 11 and second winding 12 for example are located farthest out relative to other members, and exposed outward. Heat generated from windings 11, 12 can therefore be dissipated highly efficiently to the external atmosphere from the outwardly exposed portions. The topmost surface of I-type magnetic core 21 and the bottommost surface of E-type magnetic core 22 are also exposed outward. Heat generated from magnetic cores 21, 22 can therefore be dissipated highly efficiently to the external atmosphere from the outwardly exposed portions.

Fourth Embodiment

Figure 16:
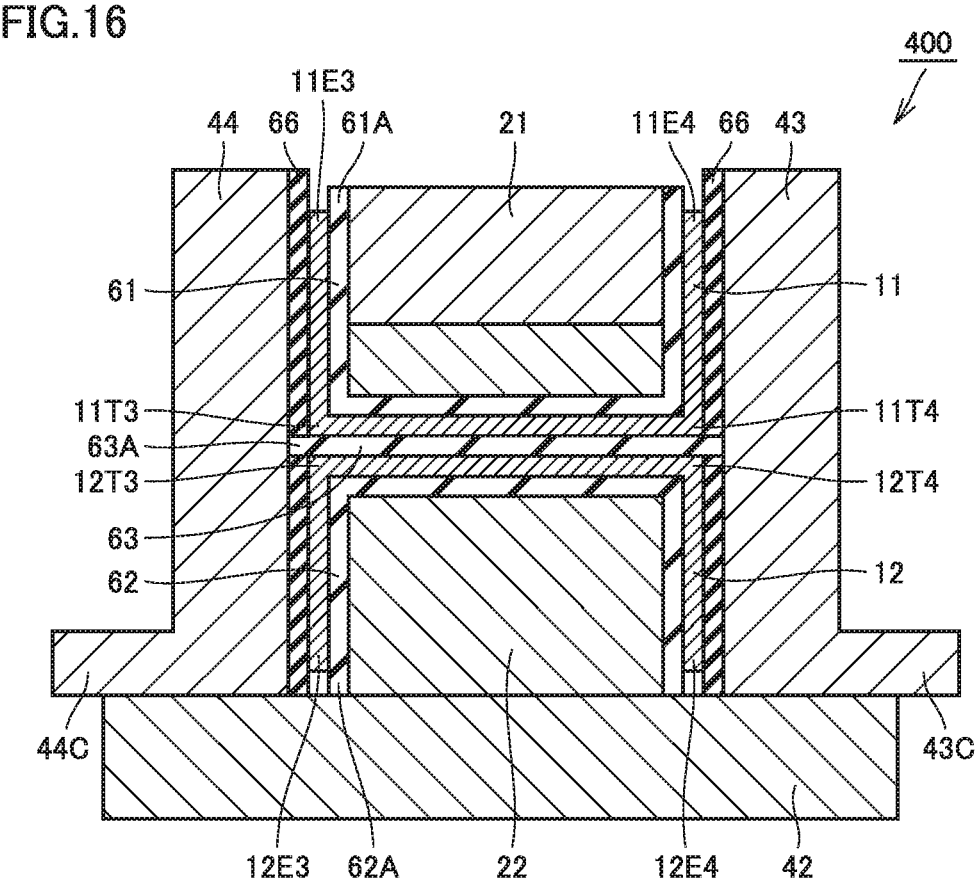
FIG. 16 is a schematic cross-sectional view showing a configuration of a power converter in a first example of a fourth embodiment.

Referring to FIG. 16, a description is given of a specific configuration of a power converter in a first example of the present embodiment.

Referring to FIG. 16, a power converter 400 in the first example of the present embodiment differs from power converter 300 in the third embodiment in that the former further includes a casing 42, sidewalls 43, 44, and an insulating member sheet 66, for example.

The shape for example of each of casing 42 and sidewalls 43, 44 in FIG. 16 is basically similar to the shape for example of each of casing 42 and sidewalls 43, 44 of power converter 201 in the second example of the second embodiment, namely in FIG. 11.

In FIG. 16, like power converter 201 in the second example of the second embodiment, namely in FIG. 11, for example, a plurality of sidewalls 43, 44 are members that are separate from casing 42. In the present embodiment, however, casing 42 and sidewalls 43, 44 may form a single body, like power converter 200 in FIG. 9, for example. In FIG. 16, screws and heat dissipation grease for joining sidewalls 43, 44 and casing 42 to each other are not shown. However, as shown in FIG. 11, they may be joined to each other by screws 51 and heat dissipation greases 43A, 44A.

A method for assembling magnetic cores 21, 22, windings 11, 12, and insulting members 61, 62, 63 in the first example of the present embodiment is basically similar to the method in the third embodiment. A method for assembling these components with casing 42 and sidewalls 43, 44 is basically similar to the method in the second example of the second embodiment. The description of the methods for assembling them will therefore not be repeated.

In the second example of the second embodiment, only the first portion of first winding 11 and the second portion of second winding 12 are each a region located outward relative to the other winding and exposed outward. In order to enable contact with these outwardly disposed portions of first and second windings 11, 12, insulating member sheet 66 is attached to only the inner surface of sidewall 44 in the lower region (than windings 11, 12 extending in the right-left direction) and the inner surface of sidewall 43 in the upper region (than windings 11, 12 extending in the right-left direction).

In contrast, in the present embodiment, both the first portion and the second portion of each of first winding 11 and second winding 12 are disposed outward with respect to magnetic cores 21, 22. In order to enable contact with these outwardly disposed portions of windings 11, 12, insulating member sheet 66 is attached to respective inner surfaces of sidewalls 43, 44 in both the upper and lower regions (than windings 11, 12 extending in the right-left direction). Accordingly, the first and second portions of first winding 11 and second winding 12 are each located between and in contact with insulating member sheet 66 and insulating member 61, 62. The material for example of insulating member sheet 66 is similar to that in the second embodiment.

Power converter 400 in the first example of the present embodiment differs from power converters 201, 300 in the second and third embodiments in the above-described respects. In other respects, the present embodiment is substantially identical in configuration to the second and third embodiments. Therefore, the same elements are denoted by the same reference characters, and the description thereof will not be repeated.

Functions and advantages of the power converter in the first example of the present embodiment are now described.

In the first example of the present embodiment, the portions corresponding to the first and second portions of first winding 11 and second winding 12 exposed outward in the third embodiment are in contact with high-heat-dissipation insulating member sheet 66 that is attached to sidewalls 43, 44. In other words, the first and second portions of first winding 11 and second winding 12 are in contact with casing 42 (sidewalls 43, 44) serving as a heat dissipater, through insulating member sheet 66. Therefore, instead of high-efficient dissipation, to the outside, of heat generated from first and second portions of windings 11, 12, high-efficient dissipation of heat generated therefrom, from high-heat-dissipation insulating member sheet 66 to sidewalls 43, 44 is possible. Sidewalls 43, 44 are heat dissipater joined to casing 42 (or forming a single body together with casing 42), and therefore, heat transferred to sidewalls 43, 44 is immediately transferred to casing 42.

As described above, the configuration like the above-described first example can be implemented easily, since the first portion of first winding 11 and the first portion of second winding 12 are coplanar and the second portion of first winding 11 and the second portion of second winding 12 are coplanar. This is because insulating member sheet 66 to be in contact with the first portion of first winding 11 and insulating member sheet 66 to be in contact with the first portion of second winding 12 can be formed on the same plane (on the inner surface of sidewall 44).

Moreover, particularly the bottommost surface of E-type magnetic core 22 is in direct contact with casing 42, and therefore, heat generated from magnetic cores 21, 22 is dissipated highly efficiently to casing 42.

Accordingly, the present embodiment, like the other embodiments, can provide power converter 400 that enables all of downsizing, electrical insulation, and heat dissipation.

The electrical insulation property for the components and the heat dissipation paths in the first example are basically similar to those of the other embodiments as described above, and therefore, the detailed description thereof will not be repeated.

Figure 17:
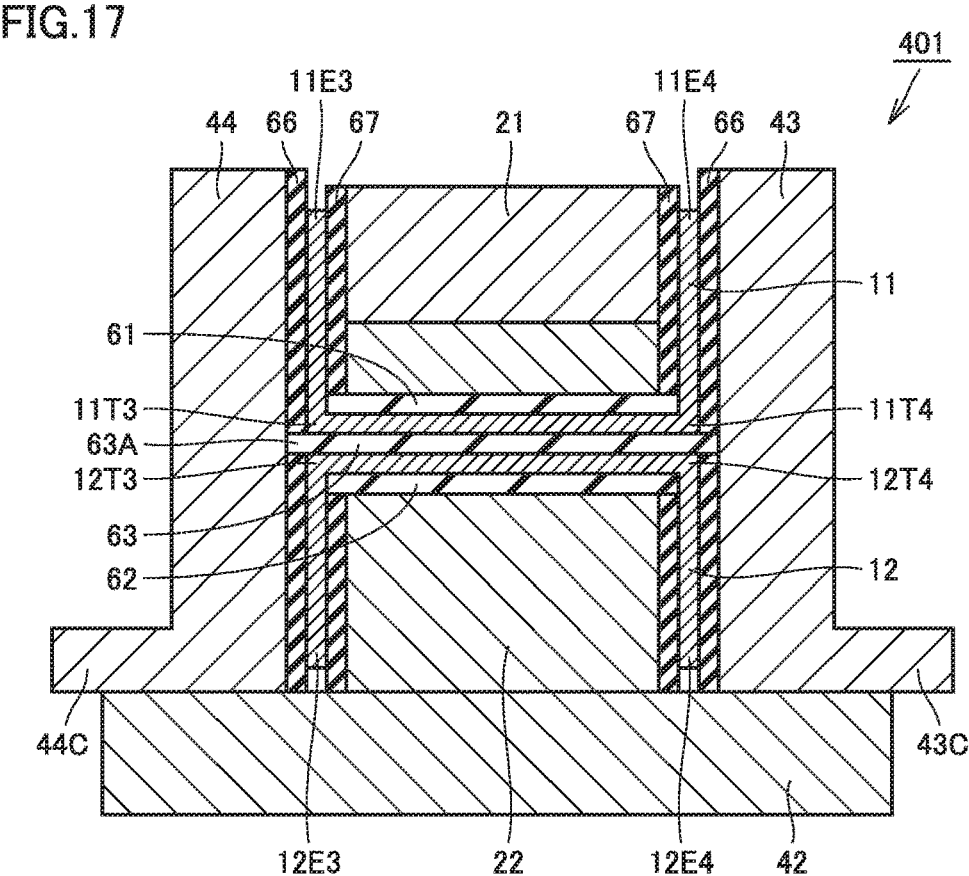
FIG. 17 is a schematic cross-sectional view showing a configuration of a power converter in a second example of the fourth embodiment.

Referring next to FIG. 17, a specific configuration of a power converter in a second example of the present embodiment is described.

Referring to FIG. 17, a power converter 401 in the second example of the present embodiment is basically similar in configuration to power converter 400 in the first example. In power converter 401, however, windings 11, 12 each have a side which is in contact with insulating member sheet 66 and the opposite side (magnetic core 21, 22 side, or inner side) which is in contact with an insulating member sheet 67. In this respect, power converter 401 differs in configuration from power converter 400 in which windings 11, 12 each have a side which is in contact with insulating member sheet 66 and the opposite side (magnetic core 21, 22 side, or inner side) which is in contact with a part of insulating member 61, 62 in C shape.

Specifically, in power converter 401, insulating member sheet 67, instead of insulating members 61, 62, is disposed in the region between the first and second portions of windings 11, 12 and magnetic cores 21, 22 (so that they are in contact with both windings 11, 12 and magnetic cores 21, 22). Insulating members 61, 62 therefore do not have C shape but extend only in the right-left direction in FIG. 17, like insulating member 63.

Insulating member sheet 67 is made from a similar material to insulating member sheet 66. Specifically, insulating member sheet 67 like insulating member sheet 66 is a soft sheet-type member disposed to serve as a high-heat-dissipation insulating member and having a higher thermal conductivity than insulating members 61, 62, 63.

Power converter 401 in the second example differs from power converter 400 in the first example in the above-described respects. In other respects, the second example is substantially identical in configuration to the first example. Therefore, the same elements are denoted by the same reference characters, and the description thereof will not be repeated.

Functions and advantages of the power converter in the second example of the present embodiment are now described.

The functions and advantages of the second example are basically similar to those of the first example and other embodiments described above. The second example can also provide power converter 401 that enables all of downsizing, electrical insulation, and heat dissipation.

As to the electrical insulation property for each component, referring to FIG. 17 for example, the length in the right-left direction of first winding 11 and second winding 12 is longer than the length in the right-left direction of insulating members 61, 62. Accordingly, an adequate thickness (in the right-left direction in FIG. 17) of insulating member sheet 67 can be ensured and the electrical insulation property of the sheet can thus be ensured.

As to the heat dissipation property for each component, in power converter 400 in the first example, for example, heat generated from I-type magnetic core 21 can be adequately dissipated from only its topmost surface exposed outward. In contrast, in power converter 401 in the second example, a part of the surface of I-type magnetic core 21 is in contact with insulating member sheet 67, insulating member sheet 67 is in contact with the first and second portions of windings 11, 12, and the first and second portions are also in contact with insulating member sheet 66. Further, insulating member sheet 66 is in contact with sidewalls 43, 44. I-type magnetic core 21 of power converter 401 thus has an adequate heat dissipation path extending through insulating member sheet 67, and heat dissipation is therefore improved relative to I-type magnetic core 21 in power converter 400. E-type magnetic core 22 is also in contact with insulating member sheet 67, and therefore power converter 401 is improved in heat dissipation relative to power converter 400.

Figure 18:
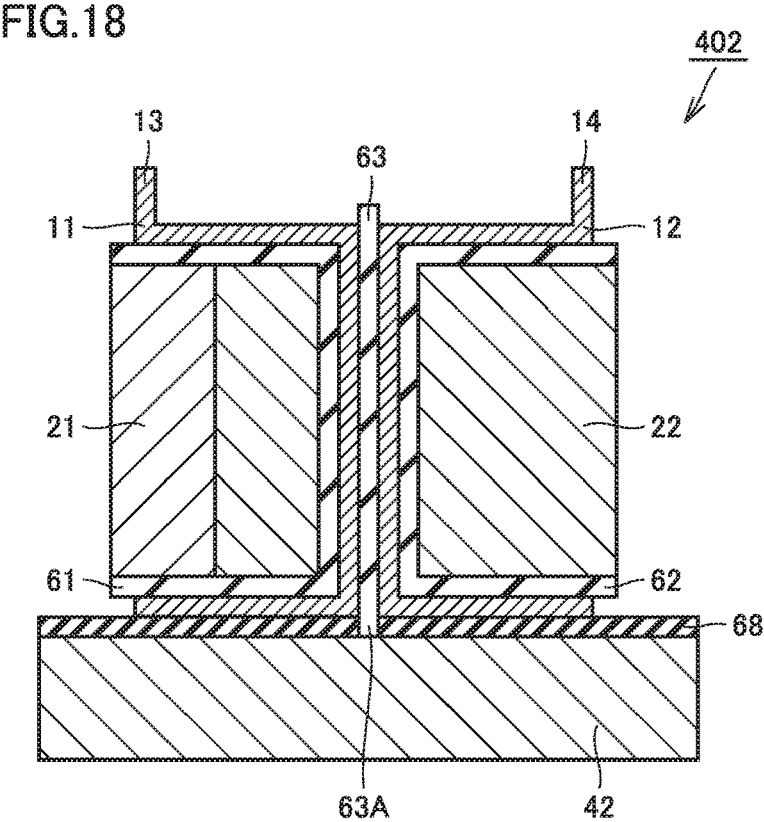
FIG. 18 is a schematic cross-sectional view showing a configuration of a power converter in a third example of the fourth embodiment.

Referring next to FIG. 18, a specific configuration of a power converter in a third example of the present embodiment is described.

Referring to FIG. 18, in a power converter 402 in the third example of the present embodiment, windings 11, 12 and insulating members 61, 62, 63 are wound around magnetic cores 21, 22, similarly to the first and second examples. In power converter 402, however, magnetic cores 21, 22 are arranged in the direction along the surface of casing 42 on which magnetic cores 21, 22 for example are mounted. In other words, in each of the examples shown in FIG. 17 and the preceding drawings, I-type magnetic core 21 and E-type magnetic core 22 are arranged in the vertical direction in each drawing. In contrast, in FIG. 18, I-type magnetic core 21 and E-type magnetic core 22 are arranged in the horizontal direction. In this respect, the third example differs in configuration from other examples. Specifically, the configuration in FIG. 18 is implemented by rotating, by about 90°, the configuration including I-type magnetic core 21, E-type magnetic core 22, and insulating members 61, 62, 63 in other examples.

The positions at which windings 11, 12 and insulating members 61, 62, 63 are arranged with respect to magnetic cores 21, 22, the shapes, and the assembling method are basically similar to the third embodiment and the first example of the fourth embodiment, and they are bent in so-called C shape in a cross-sectional view. Specifically, insulating member 63 is disposed in the region between first winding 11 and second winding 12. Insulating member 61 is disposed between first winding 11 and the magnetic cores (I-type magnetic core 21 and E-type magnetic core 22), and insulating member 62 is disposed between second winding 12 and the magnetic core (E-type magnetic core 22).

Respective portions of windings 11, 12 extending in the right-left direction and disposed above magnetic cores 21, 22 in FIG. 18 are further bent upward to form extensions 13, 14. These portions of windings 11, 12 are exposed outward. Moreover, an insulating member sheet 68 is disposed between casing 42 and each of respective portions of windings 11, 12 extending in the right-left direction and disposed below magnetic cores 21, 22 in FIG. 18. Namely, insulating member sheet 68 is disposed between and in contact with windings 11, 12 and casing 42.

Insulating member sheet 68 is formed from a similar material to insulating member sheet 66. Specifically, like insulating member sheet 66, insulating member sheet 68 is a soft sheet-type member that is disposed to serve as a high-heat-dissipation insulating member and have a higher thermal conductivity than insulating members 61, 62, 63.

Power converter 402 in the third example differs from power converters 400, 401 in the first and second examples in the above-described respects. In other respects, the third example is substantially identical in configuration to the first and second examples. Therefore, the same elements are denoted by the same reference characters, and the description thereof will not be repeated.

Functions and advantages of the power converter in the third example of the present embodiment are now described.

The functions and advantages in the third example are basically similar to those of the first example, the second example, and other embodiments described above. The third example can also provide power converter 402 that enables all of downsizing, electrical insulation, and heat dissipation.

As to the electrical insulation property for each component, referring to FIG. 18 for example, the length in the top-bottom direction of insulating member 63 is longer than the length in the top-bottom direction of first winding 11 and second winding 12. In particular, the bottommost portion of insulating member 63 extends downward further than the bottommost portions of first winding 11 and second winding 12. Accordingly, an adequate thickness of insulating member sheet 68 (in the top-bottom direction in FIG. 18) can be ensured, and the electrical insulation property of the sheet can be ensured.

As to the heat dissipation property for each component, the bottommost portions of first winding 11 and second winding 12 for example are located in contact with insulating member sheet 68, and therefore, heat generated from windings 11, 12 is dissipated highly efficiently to casing 42 through insulating member sheet 68. Heat generated from I-type magnetic core 21 is dissipated highly efficiently from its exposed leftmost surface in FIG. 18, and heat generated from E-type magnetic core 22 is dissipated highly efficiently from its exposed rightmost surface. Sidewalls 44, 43 (not shown) may be arranged leftward of I-type magnetic core 21 and rightward of E-type magnetic core 22 to sandwich high-heat-dissipation insulating member sheet 66 in between, like FIGS. 16 and 17, for example. At this time, insulating member sheet 66 is arranged in contact with both sidewalls 44, 43 and magnetic cores 21, 22.

The features of respective configurations of the embodiments may be combined appropriately within a technically consistent scope.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 input-side drive circuit; 2 output-side drive circuit; 10 transformer; 11 first winding; 11A, 11B, 12A, 12B connecting point; 11C, 12C, 61C, 62C, 63C opening; 11E1, 12E1, 12E3, 12E4 bottommost portion; 11E2, 11E3, 11E4, 12E2 topmost portion; 11T1, 11T3, 12T1, 12T3 first bent portion;

11T2, 11T4, 12T2, 12T4 second bent portion; 12 second winding; 15 primary winding; 16 secondary winding; 21 I-type magnetic core; 22 E-type magnetic core; 22A, 22B outer leg; 22C center leg; 22D core coupling portion; 31A, 31B, 31C, 31D switching element; 31E, 31F, 31G, 31H rectifying element; 32A, 32B capacitor; 33 coil; 43A, 44A heat-dissipation grease; 51, 52 screw; 53, 54 interconnection; 61, 62, 63, 65 insulating member; 61A, 62A, 63A end; 64 high-heat-dissipation insulating member; 66, 67, 68 insulating member sheet; 100, 101, 200, 201, 300, 400, 401, 402 power converter

The invention claimed is:

1. A power converter comprising:
a magnetic core; and
two windings each wound around the magnetic core,
each of the two windings including a first bent portion, a second bent portion, a first portion between one end and the first bent portion of the winding, and a second portion between the other end opposite to the one end and the second bent portion of the winding, the one end and the other end being ends relative to a plane extending along a central axis of the windings and from the central axis toward the bent portions,
the first and second portions extending parallel to an axis along which the magnetic core extends through the windings, and
a direction in which the first portion extends from the first bent portion is opposite to a direction in which the second portion extends from the second bent portion.

2. The power converter according to claim 1, wherein
the first portion of one winding of the two windings is disposed outward of the first portion of the other winding different from the one winding, and
the second portion of the other winding of the two windings is disposed outward of the second portion of the one winding.

3. A power converter comprising:
a magnetic core; and
two windings each wound around the magnetic core,
each of the two windings including a first bent portion, a second bent portion, a first portion between one end and the first bent portion of the winding, and a second portion between the other end opposite to the one end and the second bent portion of the winding, the one end and the other end being ends relative to a plane extending along a central axis of the windings and from the central axis toward the bent portions,
the first and second portions extending parallel to an axis along which the magnetic core extends through the windings, and
each of the plurality of windings is bent so that a direction in which the first portion extends from the first bent portion is identical to a direction in which the second portion extends from the second bent portion.

4. The power converter according to claim 3, wherein
one winding of the two windings includes a third portion between the first portion and the second portion of the one winding, the other winding of the two windings that is different from the one winding includes a third portion between the first portion and the second portion of the other winding, and the third portion of the one winding and the third portion of the other winding are superposed on each other, and
the first portion of the one winding and the first portion of the other winding are coplanar, and the second portion of the one winding and the second portion of the other winding are coplanar.

5. The power converter according to claim 1, further comprising a heat dissipater disposed in contact with one end face of the magnetic core, wherein
the region of each of the plurality of windings that is located farthest out is in contact with the heat dissipater through a high-heat-dissipation insulating member.

6. The power converter according to claim 5, wherein
the high-heat-dissipation insulating member has a thermal conductivity of 0.5 W/mK or more.

7. The power converter according to claim 1, wherein at least a part of a surface of the magnetic core is exposed outward.

8. The power converter according to claim 3, further comprising a heat dissipater disposed in contact with one end face of the magnetic core, wherein
the region of each of the plurality of windings that is located farthest out is in contact with the heat dissipater through a high-heat-dissipation insulating member.

9. The power converter according to claim 8, wherein
the high-heat-dissipation insulating member has a thermal conductivity of 0.5 W/mK or more.

10. The power converter according to claim 3, wherein at least a part of a surface of the magnetic core is exposed outward.

* * * * *